US009176601B2

(12) United States Patent
Sugishita

(10) Patent No.: US 9,176,601 B2
(45) Date of Patent: Nov. 3, 2015

(54) INFORMATION PROCESSING DEVICE, COMPUTER-READABLE STORAGE MEDIUM, AND PROJECTING SYSTEM

(71) Applicant: Satoru Sugishita, Kanagawa (JP)

(72) Inventor: Satoru Sugishita, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 45 days.

(21) Appl. No.: 13/847,558

(22) Filed: Mar. 20, 2013

(65) Prior Publication Data

US 2013/0249796 A1 Sep. 26, 2013

(30) Foreign Application Priority Data

Mar. 22, 2012 (JP) ................................ 2012-065530

(51) Int. Cl.

| | |
|---|---|
| ***G06F 3/033*** | (2013.01) |
| ***G06F 3/0346*** | (2013.01) |
| ***G06F 3/01*** | (2006.01) |
| ***G06F 3/038*** | (2013.01) |
| ***G06F 3/0354*** | (2013.01) |

(Continued)

(52) U.S. Cl.

CPC .............. *G06F 3/0346* (2013.01); *G06F 3/017* (2013.01); *G06F 3/0386* (2013.01); *G06F 3/03542* (2013.01); *H04N 9/3179* (2013.01); *G06Q 10/00* (2013.01)

(58) Field of Classification Search

CPC ..... G06F 3/017; G06F 3/0386; G06F 3/0346; G06F 3/03542; G06F 21/32; G06Q 10/00; H04N 9/3179

USPC ............ 345/156, 158, 179; 704/275; 715/863

See application file for complete search history.

(56) References Cited

U.S. PATENT DOCUMENTS 5,341,155 A * 8/1994 Elrod et al. .................. 345/179
5,572,728 A 11/1996 Tada et al.

(Continued)

FOREIGN PATENT DOCUMENTS

CN 1289086 A 3/2001
CN 1786981 A 6/2006

(Continued)

OTHER PUBLICATIONS

Office Action issued Aug. 26, 2015 in Chinese Patent Application No. 201310095066.9 (with English translation).

*Primary Examiner* — Lun-Yi Lao
*Assistant Examiner* — Peter D McLoone
(74) *Attorney, Agent, or Firm* — Oblon, McClelland, Maier & Neustadt, L.L.P.

(57) ABSTRACT

An information processing device includes a storage unit configured to store a predetermined motion of a user who uses an operating device and an attribute of the predetermined motion per role of the user in association with each other; an image capturing unit configured to capture an image of a predetermined area including a projection area on which a projecting device projects an image; an identification unit configured to identify the attribute associated with the predetermined motion corresponding to a motion of light emitted to the predetermined area from the operating device based on the motion of light and an operation signal, referring to the storage unit; a synthetic image generation unit configured to generate a synthetic image by reflecting the attribute of the predetermined motion in the image projected; and a history record unit configured to generate history data including the synthetic image, the role, the attribute.

4 Claims, 24 Drawing Sheets

(51) Int. Cl.
*H04N 9/31* (2006.01)
*G06Q 10/00* (2012.01)

(56) References Cited

U.S. PATENT DOCUMENTS

| | | | | |
|---|---|---|---|---|
| 5,712,658 | A * | 1/1998 | Arita et al. | 345/158 |
| 5,835,078 | A * | 11/1998 | Arita et al. | 345/158 |
| 6,188,388 | B1 * | 2/2001 | Arita et al. | 345/158 |
| 8,065,345 | B2 * | 11/2011 | Robertson et al. | 707/805 |
| 8,106,884 | B2 * | 1/2012 | Nam et al. | 345/158 |
| 8,473,420 | B2 * | 6/2013 | Bohus et al. | 705/319 |
| 8,516,561 | B2 * | 8/2013 | White et al. | 726/7 |
| 8,542,188 | B2 * | 9/2013 | Yamamoto et al. | 345/158 |
| 8,726,196 | B2 * | 5/2014 | Yamaoka et al. | 715/863 |
| 2002/0075334 | A1 * | 6/2002 | Yfantis | 345/863 |
| 2003/0067629 | A1 | 4/2003 | Sugishita | |
| 2004/0057066 | A1 | 3/2004 | Sugishita et al. | |
| 2004/0095602 | A1 | 5/2004 | Sugishita et al. | |
| 2004/0145766 | A1 | 7/2004 | Sugishita et al. | |
| 2004/0237041 | A1 | 11/2004 | Koike et al. | |
| 2005/0268104 | A1 | 12/2005 | Sugishita et al. | |
| 2006/0064297 | A1 | 3/2006 | Sugishita et al. | |
| 2006/0182417 | A1 | 8/2006 | Sugishita | |
| 2006/0238493 | A1 * | 10/2006 | Dunton | 345/156 |
| 2007/0041047 | A1 | 2/2007 | Sugishita | |
| 2007/0076244 | A1 | 4/2007 | Suzuki et al. | |
| 2007/0083629 | A1 | 4/2007 | Sugishita | |
| 2007/0216644 | A1 * | 9/2007 | Nam et al. | 345/158 |
| 2007/0223068 | A1 | 9/2007 | Ishii et al. | |
| 2007/0279667 | A1 | 12/2007 | Hattori et al. | |
| 2008/0040392 | A1 | 2/2008 | Sugishita | |
| 2008/0046720 | A1 | 2/2008 | Sugishita et al. | |
| 2008/0049250 | A1 | 2/2008 | Sugishita | |
| 2008/0049520 | A1 | 2/2008 | Kang et al. | |
| 2008/0062450 | A1 | 3/2008 | Sugishita et al. | |
| 2009/0051671 | A1 * | 2/2009 | Konstas | 345/174 |
| 2009/0132926 | A1 * | 5/2009 | Bucha | 715/730 |
| 2009/0295721 | A1 * | 12/2009 | Yamamoto et al. | 345/158 |
| 2010/0066673 | A1 * | 3/2010 | Yeh | 345/158 |
| 2010/0077379 | A1 | 3/2010 | Sugishita | |
| 2010/0083373 | A1 * | 4/2010 | White et al. | 726/21 |
| 2010/0198787 | A1 * | 8/2010 | Robertson et al. | 707/634 |
| 2010/0289743 | A1 * | 11/2010 | Sun et al. | 345/158 |
| 2010/0332648 | A1 * | 12/2010 | Bohus et al. | 709/224 |
| 2011/0016474 | A1 | 1/2011 | Sugishita et al. | |
| 2011/0119638 | A1 * | 5/2011 | Forutanpour | 715/863 |
| 2011/0239118 | A1 * | 9/2011 | Yamaoka et al. | 715/709 |
| 2011/0298703 | A1 | 12/2011 | Shingu et al. | |
| 2012/0159567 | A1 * | 6/2012 | Toy et al. | 726/1 |
| 2012/0250091 | A1 | 10/2012 | Sugishita | |
| 2013/0067365 | A1 * | 3/2013 | Shrufi et al. | 715/764 |
| 2013/0104227 | A1 * | 4/2013 | Dow et al. | 726/19 |
| 2013/0162519 | A1 * | 6/2013 | Ameling et al. | 345/156 |
| 2013/0307774 | A1 * | 11/2013 | Hayashi et al. | 345/158 |
| 2013/0318445 | A1 * | 11/2013 | Mitchell et al. | 715/744 |

FOREIGN PATENT DOCUMENTS

| | | | |
|---|---|---|---|
| CN | 101256457 | A | 9/2008 |
| CN | 102053789 | A | 5/2011 |
| JP | 3185505 | | 5/2001 |
| JP | 2001-273503 | | 10/2001 |
| JP | 2006-011854 | | 1/2006 |
| JP | 2006-146415 | | 6/2006 |
| JP | 3982451 | | 7/2007 |

* cited by examiner

111

| ROLE | GESTURE |
| --- | --- |
| FACILITATOR | ○ |
| PRESENTER | □ |
| POINTER | △ |
| CANCEL | × |
| ⋮ | ⋮ |

FIG.4

PLEASE SPECIFY ROLES OF CONFERENCE PARTICIPANTS

| ROLE | GESTURE | REGISTRATION RESULT |
|---|---|---|
| FACILITATOR | ○ | 1004 (OPERATING DEVICE 60) |
| PRESENTER | □ | 1001 (OPERATING DEVICE 50) |
| POINTER | △ | 1002 (OPERATING DEVICE 30) |
| POINTER | △ | 1003 (OPERATING DEVICE 40) |
| CANCEL | × | |

FACILITATOR NEEDS TO SPECIFY START OF CONFERENCE

| ATTRIBUTE | GESTURE |
|---|---|
| START | / |
| END | ✗ |

| OPERATING DEVICE ID | ROLE |
|---|---|
| 1001 (OPERATING DEVICE 50) | PRESENTER |
| 1002 (OPERATING DEVICE 30) | POINTER |
| 1003 (OPERATING DEVICE 40) | POINTER |
| 1004 (OPERATING DEVICE 60) | FACILITATOR |
| ⋮ | ⋮ |

<FOR POINTER>

| ATTRIBUTE | USE FREQUENCY | ROLE OF USER | GESTURE | MARKING COLOR |
|---|---|---|---|---|
| CORRECT | MIDDLE | POINTER | ○ | BLUE |
| WRONG | MIDDLE | POINTER | レ | RED |
| DELETE | LOW | POINTER | ≠ | GRAY |
| ADDITION OF EXPLANATION | HIGH | POINTER | < | YELLOW |
| LESS THOUGHT OUT | HIGH | POINTER | △ | GREEN |
| CANCELATION OF POINTING OUT | HIGH | POINTER | × | - |
| ⋮ | ⋮ | ⋮ | ⋮ | ⋮ |

<FOR PRESENTER>

| ATTRIBUTE | USE FREQUENCY | ROLE OF USER | GESTURE |
|---|---|---|---|
| PAGE TURN | HIGH | PRESENTER | → |
| PAGE TURN BACK | HIGH | PRESENTER | ← |
| ENLARGEMENT OF SCREEN | LOW | PRESENTER | ↑↓ |
| REDUCTION OF SCREEN | LOW | PRESENTER | ↓↑ |
| ANIMATION TURN | MIDDLE | PRESENTER | · |
| ANIMATION TURN BACK | MIDDLE | PRESENTER | ·· |
| ⋮ | ⋮ | ⋮ | ⋮ |

<FOR FACILITATOR>

| ATTRIBUTE | USE FREQUENCY | ROLE OF USER | GESTURE |
|---|---|---|---|
| START | LOW | FACILITATOR | / |
| END | LOW | FACILITATOR | 〆 |
| CHANGE TO PRESENTER | HIGH | FACILITATOR | 2 |
| CHANGE TO POINTER | MIDDLE | FACILITATOR | 3 |
| ⋮ | ⋮ | ⋮ | ⋮ |

<GESTURE FOR POINTER>

| ATTRIBUTE | GESTURE | MARKING COLOR |
|---|---|---|
| CORRECT | ○ | BLUE |
| WRONG | レ | RED |
| DELETE | ≠ | GRAY |
| ADDITION OF EXPLANATION | < | YELLOW |
| LESS THOUGHT OUT | △ | GREEN |
| CANCELATION OF POINTING OUT | × | - |

<GESTURE FOR FACILITATOR>

| ATTRIBUTE | GESTURE |
|---|---|
| START | / |
| END | ∝ |
| CHANGE TO PRESENTER | 2 |
| CHANGE TO POINTER | 3 |

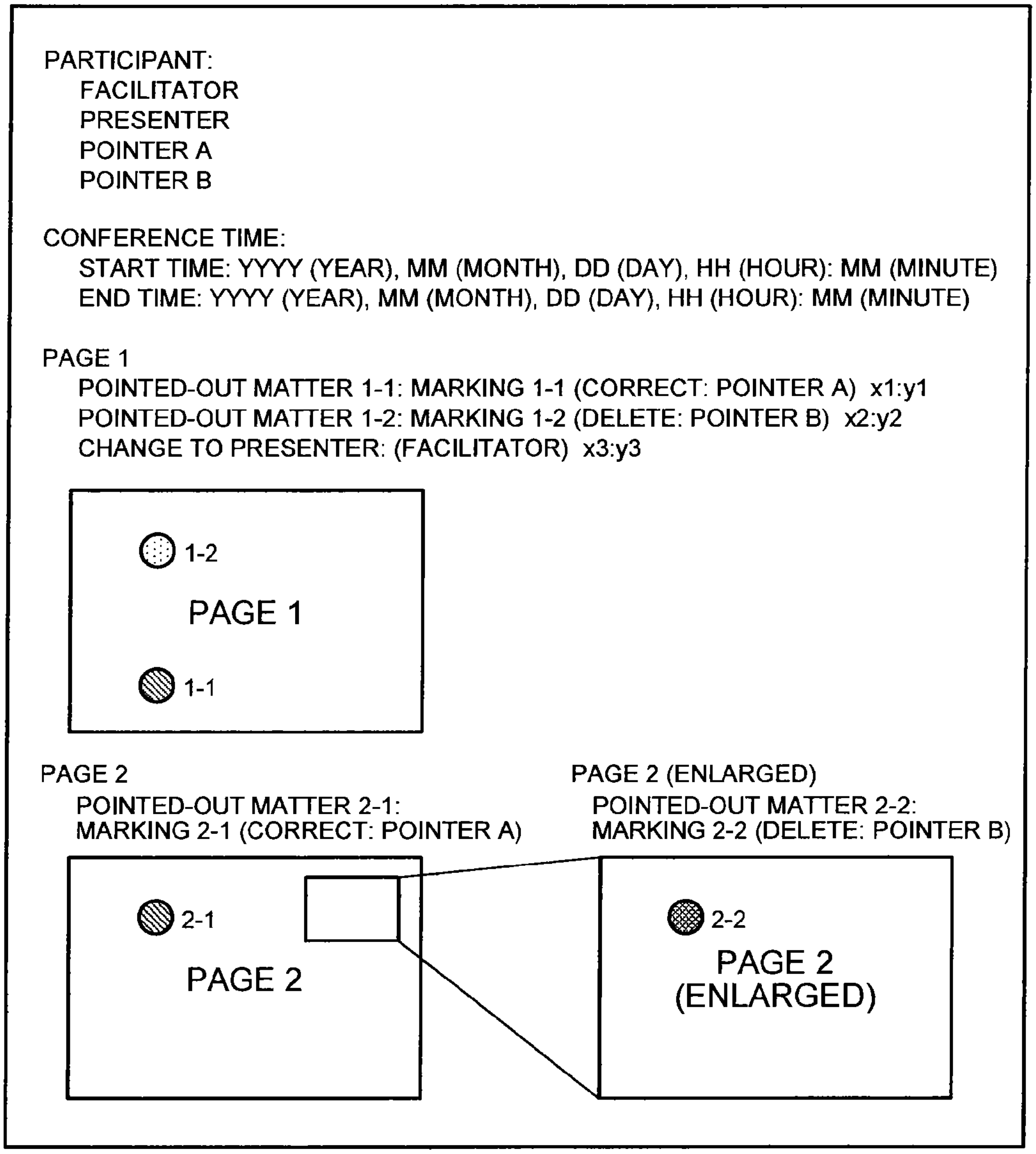

FIG.9

PARTICIPANT:
   FACILITATOR
   PRESENTER
   POINTER A
   POINTER B

CONFERENCE TIME:
   START TIME: YYYY (YEAR), MM (MONTH), DD (DAY), HH (HOUR): MM (MINUTE)
   END TIME: YYYY (YEAR), MM (MONTH), DD (DAY), HH (HOUR): MM (MINUTE)

PAGE 1
   POINTED-OUT MATTER 1-1: MARKING 1-1 (CORRECT: POINTER A) x1:y1
   POINTED-OUT MATTER 1-2: MARKING 1-2 (DELETE: POINTER B) x2:y2
   CHANGE TO PRESENTER: (FACILITATOR) x3:y3

PAGE 2
   POINTED-OUT MATTER 2-1:
   MARKING 2-1 (CORRECT: POINTER A)

PAGE 2 (ENLARGED)
   POINTED-OUT MATTER 2-2:
   MARKING 2-2 (DELETE: POINTER B)

<FOR PRESENTER (DURING PRESENTATION)>

| ATTRIBUTE | USE FREQUENCY | ROLE OF USER | GESTURE |
|---|---|---|---|
| PAGE TURN | HIGH | PRESENTER | → |
| PAGE TURN BACK | HIGH | PRESENTER | ← |
| ENLARGEMENT OF SCREEN | LOW | PRESENTER | ↑↓ |
| REDUCTION OF SCREEN | LOW | PRESENTER | ↓↑ |
| ANIMATION TURN | MIDDLE | PRESENTER | · |
| ANIMATION TURN BACK | MIDDLE | PRESENTER | ·· |
| ⋮ | ⋮ | ⋮ | ⋮ |

<FOR PRESENTER (DURING POINTING OUT)>

| ATTRIBUTE | USE FREQUENCY | ROLE OF USER | GESTURE |
|---|---|---|---|
| START OF RESPONSE | HIGH | PRESENTER | O |
| ⋮ | ⋮ | ⋮ | ⋮ |

<FOR PRESENTER (DURING RESPONSE)>

| ATTRIBUTE | USE FREQUENCY | ROLE OF USER | GESTURE |
|---|---|---|---|
| PAGE TURN | HIGH | PRESENTER | → |
| PAGE TURN BACK | HIGH | PRESENTER | ← |
| ENLARGEMENT OF SCREEN | LOW | PRESENTER | ↑↓ |
| REDUCTION OF SCREEN | LOW | PRESENTER | ↓↑ |
| ANIMATION TURN | MIDDLE | PRESENTER | · |
| ANIMATION TURN BACK | MIDDLE | PRESENTER | ·· |
| END OF RESPONSE | HIGH | PRESENTER | // |
| ⋮ | ⋮ | ⋮ | ⋮ |

FIG.21

<DURING POINTING OUT>

<GESTURE FOR POINTER>

| ATTRIBUTE | GESTURE | MARKING COLOR |
|---|---|---|
| CORRECT | O | BLUE |
| WRONG | レ | RED |
| DELETE | ≠ | GRAY |
| ADDITION OF EXPLANATION | < | YELLOW |
| LESS THOUGHT OUT | △ | GREEN |
| CANCELATION OF POINTING OUT | × | - |

<GESTURE FOR FACILITATOR>

| ATTRIBUTE | GESTURE |
|---|---|
| START | / |
| END | 〆 |
| CHANGE TO PRESENTER | 2 |
| CHANGE TO POINTER | 3 |

<GESTURE FOR PRESENTER>

| ATTRIBUTE | GESTURE |
|---|---|
| START OF RESPONSE | O |

POINTER'S COMMENT

COMMENT

RESPONDENT'S COMMENT

COMMENT

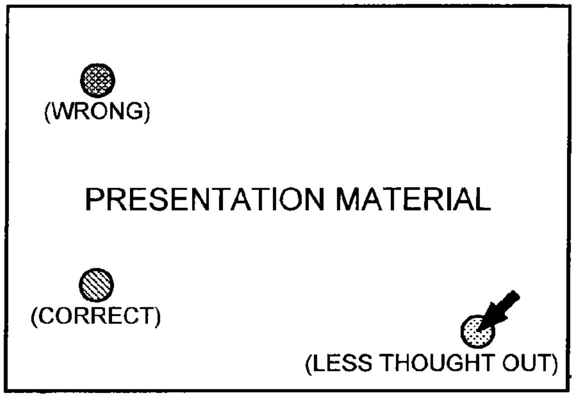

<DURING RESPONSE>

<GESTURE FOR POINTER>

| ATTRIBUTE | GESTURE | MARKING COLOR |
|---|---|---|
| CORRECT | O | BLUE |
| WRONG | レ | RED |
| DELETE | ≠ | GRAY |
| ADDITION OF EXPLANATION | < | YELLOW |
| LESS THOUGHT OUT | △ | GREEN |
| CANCELATION OF POINTING OUT | × | - |

<GESTURE FOR FACILITATOR>

| ATTRIBUTE | GESTURE |
|---|---|
| START | / |
| END | 〆 |
| CHANGE TO PRESENTER | 2 |
| CHANGE TO POINTER | 3 |

<GESTURE FOR PRESENTER>

| ATTRIBUTE | GESTURE |
|---|---|
| PAGE TURN | → |
| PAGE TURN BACK | ← |
| ENLARGEMENT OF SCREEN | ↑↓ |
| REDUCTION OF SCREEN | ↓↑ |
| ANIMATION TURN | · |
| ANIMATION TURN BACK | ·· |
| END OF RESPONSE | // |

POINTER'S COMMENT

COMMENT

RESPONDENT'S COMMENT

COMMENT

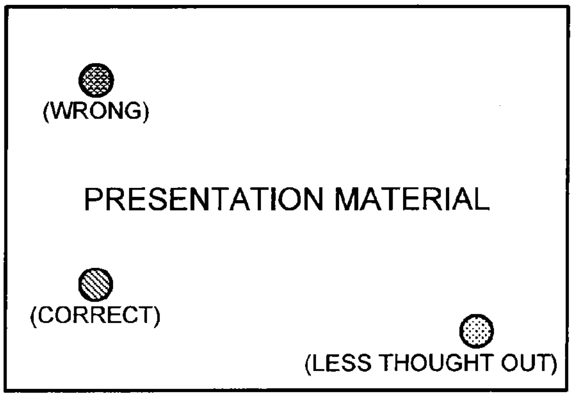

FIG.22

PARTICIPANT:
FACILITATOR
PRESENTER
POINTER A
POINTER B
CLERK

CONFERENCE TIME:
START TIME: YYYY (YEAR), MM (MONTH), DD (DAY), HH (HOUR): MM (MINUTE)
END TIME: YYYY (YEAR), MM (MONTH), DD (DAY), HH (HOUR): MM (MINUTE)

PAGE 1
POINTED-OUT MATTER 1-1: MARKING 1-1 (CORRECT: POINTER A)
<COMMENT>
POINT OF ○○ IS PARTICULARLY GOOD
POINTED-OUT MATTER 1-2: MARKING 1-2 (DELETE: POINTER B)

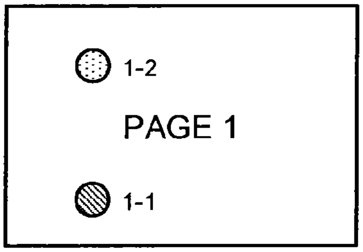

PAGE 2
POINTED-OUT MATTER 2-1: MARKING 2-1 (LACK OF EXPLANATION: POINTER A)

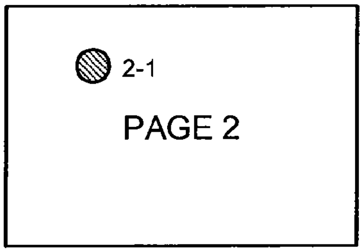

RESPONSE 2-1:
<COMMENT>
NECESSARY INFORMATION IS DISCLOSED IN PAGE 1 OF MATERIAL

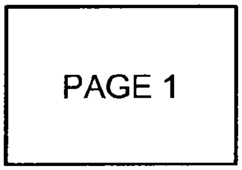

INFORMATION PROCESSING DEVICE, COMPUTER-READABLE STORAGE MEDIUM, AND PROJECTING SYSTEM

CROSS-REFERENCE TO RELATED APPLICATION

The present application claims priority to and incorporates by reference the entire contents of Japanese Patent Application No. 2012-065530 filed in Japan on Mar. 22, 2012.

BACKGROUND OF THE INVENTION

1. Field of the Invention

The present invention relates to an information processing device, a computer-readable storage medium, and a projecting system.

2. Description of the Related Art

Conventionally, at conferences at which a plurality of participants attend, participants perform variously pointing out with respect to presentation materials used in presentation of a presenter. Further, at such a conference, minutes may be created to review development of the conference including, for example, pointing out to a presentation material later or tell the content of the conference for people who did not attend the conference. There is a difference in quality of minutes to be created depending on a skill level of a participant who is in charge of creating the minutes. When, for example, the skill level of a participant who is in charge of creating the minutes is low, the minutes become unuseful and therefore the minutes are corrected by another participant of a higher skill level in some cases and time efficiency to create the minutes decreases. Hence, a presenter of a high skill level may create the minutes.

Further, U.S. Pat. No. 3,982,451 discloses a technique of associating and collectively managing different position information per application, and assigning an association between a plurality of applications used upon a review. Furthermore, U.S. Pat. No. 3,185,505 discloses a technique of creating files representing importance of conferences in time series based on, for example, frequency information of keywords and statements made during a conference.

However, conventional techniques have a problem that it is difficult to easily create conference minutes without decreasing a proceeding speed of a conference. With regard to creation of minutes, suitable minutes are preferably created by a person in charge of creating the minutes during a conference irrespectively of the degree of a skill level. In this regard, no conventional technique is suitable for use in creating minutes during a conference. Further, when a presenter of a high skill level creates minutes during a conference, the presenter needs to create the minutes while making a presentation, and therefore the proceeding speed of the conference becomes slow. As a result, the conventional techniques have difficulty in easily creating conference minutes without decreasing a proceeding speed of a conference.

Therefore, there is a need to provide an information processing device, a computer-readable storage medium, and a projecting system which can easily create conference minutes without decreasing a proceeding speed of a conference.

SUMMARY OF THE INVENTION

It is an object of the present invention to at least partially solve the problems in the conventional technology.

According to an embodiment, there is provided an information processing device that includes an operation information storage unit configured to store therein information on a predetermined motion of a user who uses an operating device and an attribute of the predetermined motion per role of the user in association with each other, the operating device including a light source; an operation signal receiving unit configured to receive an operation signal indicating that the operating device is operated, from the operating device; an image capturing unit configured to capture an image of a predetermined area including a projection area on which a projecting device projects an image; an identification unit configured to identify the attribute associated with the predetermined motion corresponding to a motion of light emitted to the predetermined area from the operating device based on the motion of light whose image is captured by the image capturing unit and the operation signal received by the operation signal receiving unit, referring to the operation information storage unit; a synthetic image generation unit configured to generate a synthetic image by reflecting the attribute of the predetermined motion identified by the identification unit in the image projected by the projecting device; and a history record unit configured to generate history data including the synthetic image generated by the synthetic image generation unit, description of the role, and description of the attribute.

According to another embodiment, there is provided a non-transitory computer-readable storage medium with an executable program stored thereon and executed by a computer that includes an operation information storage unit configured to store therein information on a predetermined motion of a user who uses an operating device and an attribute of the predetermined motion per role of the user in association with each other, the operating device including a light source, an operation signal receiving unit configured to receive an operation signal indicating that the operating device is operated, from the operating device, and an image capturing unit configured to capture an image of a predetermined area including a projection area on which a projecting device projects an image. The program instructs the computer to perform identifying the attribute associated with the predetermined motion corresponding to a motion of light emitted to the predetermined area from the operating device based on the motion of light whose image is captured by the image capturing unit and the operation signal received by the operation signal receiving unit, referring to the operation information storage unit; generating a synthetic image by reflecting the attribute of the predetermined motion identified by the identification unit in the image projected by the projecting device; and generating history data including the synthetic image generated, description of the role, and description of the attribute.

According to still another embodiment, there is provided a projecting system that includes an information processing device; a projecting device configured to project an image. The projecting system includes an operation information storage unit configured to store therein information on a predetermined motion of a user who uses an operating device and an attribute of the predetermined motion per role of the user in association with each other, the operating device including a light source; an operation signal receiving unit configured to receive an operation signal indicating that the operating device is operated, from the operating device; an image capturing unit configured to capture an image of a predetermined area including a projection area on which the projecting device projects the image; an identification unit configured to identify the attribute associated with the predetermined motion corresponding to a motion of light emitted to the predetermined area from the operating device based on the motion of light whose image is captured by the image capturing unit and the operation signal received by the operation signal receiving unit, referring to the operation information storage unit; a synthetic image generation unit configured to generate a synthetic image by reflecting the attribute of the predetermined motion identified by the identification unit in the image projected by the projecting device; and a history record unit configured to generate history data including the synthetic image generated by the synthetic image generation unit, description of the role, and description of the attribute; a projection control unit configured to performs control of projecting on the projecting device the synthetic image generated by the synthetic image generation unit; and a projection unit configured to project the synthetic image on the projection area under control of the projection control unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a view illustrating an example of a registration screen;

FIG. 5 is a view illustrating an example of information stored in a role storage unit;

FIG. 6 is a view illustrating an example of information stored in a gesture information storage unit according to the first embodiment;

FIG. 9 is a view illustrating an example of minute data according to the first embodiment;

FIG. 20 is a view illustrating an example of information stored in a gesture information storage unit according to the second embodiment;

FIG. 21 is a view illustrating an example of an image projected on a screen during pointing out and during a response according to the second embodiment;

FIG. 22 is a view illustrating an example of minute data according to the second embodiment;

DETAILED DESCRIPTION OF THE PREFERRED EMBODIMENTS

Embodiments of an information processing device, a history data generating program and a projecting system according to the present invention will be described with reference to the following accompanying drawings. In addition, the following embodiments by no means limit the present invention. Further, each embodiment can be adequately combined in a range which does not contradict content.

First Embodiment

System Configuration According to First Embodiment

Figure 1:
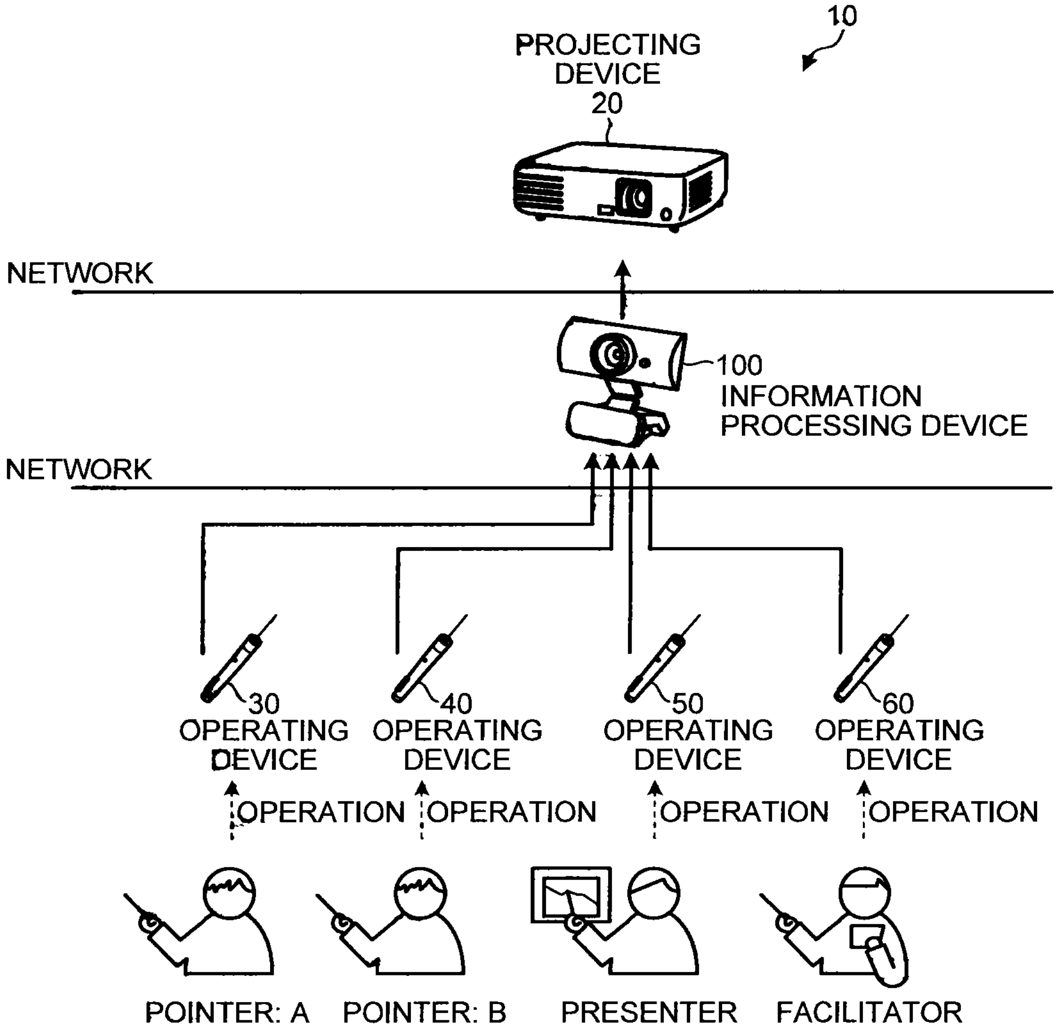
FIG. 1 is a view illustrating a configuration example of a projecting system according to a first embodiment.

A configuration of a projecting system according to a first embodiment will be described using FIG. 1. FIG. 1 is a view illustrating a configuration example of the projecting system according to the first embodiment.

As illustrated in FIG. 1, in a projecting system 10, a projecting device 20, an operating device 30, an operating device 40, an operating device 50, an operating device 60 and an information processing device 100 are connected to networks. Among these devices, the projecting device 20 is, for example, a projector which projects a predetermined image on a projection area such as a screen. Further, the projecting device 20 is a device which is a target to be operated by a user using the operating device.

The operating device 30, the operating device 40, the operating device 50 and the operating device 60 have light sources which emit light and, when operated by a user, transmit operation signals indicating that the operating devices are operated, to the information processing device 100. A user's operation of the operating device is performed by, for example, radiating light on a predetermined area including a projection area. A case will be described below as an example where the operating device 30 is operated by a "pointer A" who plays a role for performing pointing out to a presentation material, the operating device 40 is operated by a "pointer B", the operating device 50 is operated by a "presenter" who plays a role of explaining a presentation material and the operating device 60 is operated by a "facilitator" who plays a role of leading a conference. That is, a user who plays each role performs a gesture operation by moving light emitted to the predetermined area by operating the operating device. In addition, the number of operating devices is not limited to four. Further, the roles are by no means limited to the above. Furthermore, a gesture (gesture operation) is an example of a predetermined motion of a user using the operating device.

The information processing device 100 is a device such as a PC (Personal Computer) which has a camera which captures an image of the predetermined area including the projection area such as a screen. This information processing device 100 receives operation signals transmitted from the operating devices, and captures images of motions of lights emitted to the predetermined area from the operating device 30 to the operating device 60 by means of the camera. Further, the information processing device 100 identifies what gesture operation is performed using the operating device corresponding to any role, based on the received operation signal and the motion of light emitted to the predetermined area the image of which is captured by the camera. Furthermore, the information processing device 100 generates minute data (history data) by generating a synthetic image which reflects the identified gesture operation in an image which is being projected, and recording, for example, the generated synthetic image, the role of the user who performs the gesture operation and an attribute of the gesture operation in time series.

Thus, the information processing device 100 generates development of a conference matching the gesture operation as minute data during the conference, so that it is possible to easily create conference minutes without decreasing a proceeding speed of the conference. In addition, although the information processing device 100 employs a configuration including the camera with the present embodiment, the information processing device 100 is not limited to this and may employ a configuration to which a separate camera is connected.

Configuration of Information Processing Device According to First Embodiment

Figures 2, 3:
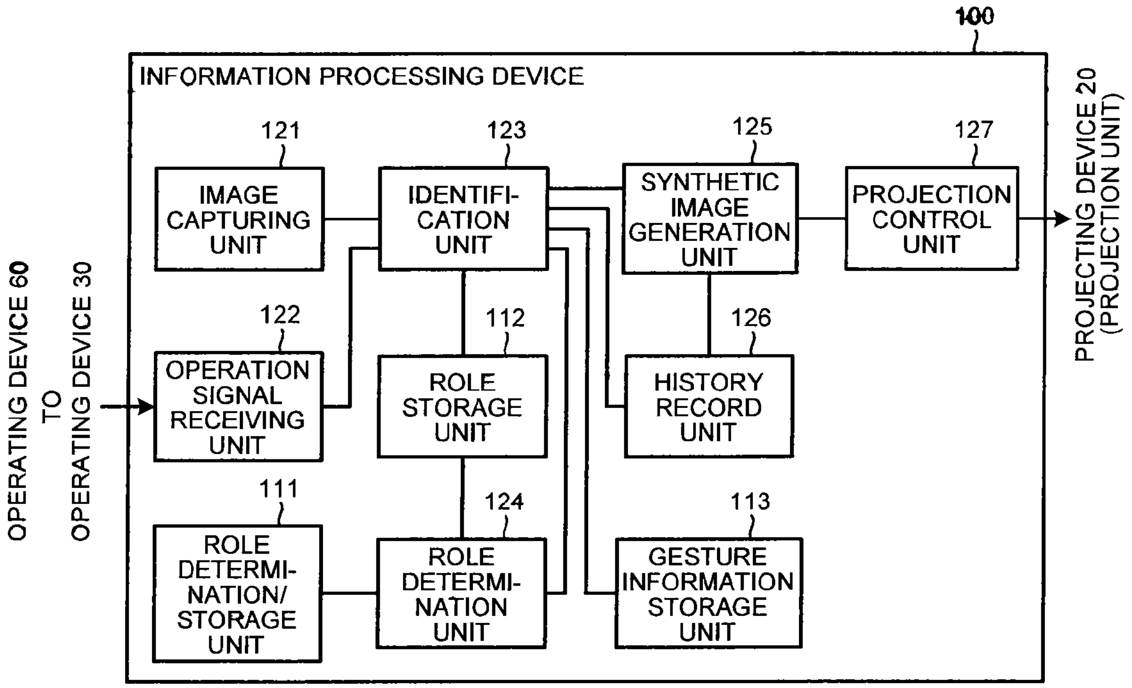
FIG. 2 is a functional block diagram illustrating a configuration example of an information processing device according to the first embodiment.
FIG. 3 is a view illustrating an example of information stored in a role determination storage unit.

Next, the configuration of the information processing device 100 according to the first embodiment will be described using FIG. 2. FIG. 2 is a functional block diagram illustrating a configuration example of the information processing device 100 according to the first embodiment.

As illustrated in FIG. 2, the information processing device 100 has a role determination storage unit 111, a role storage unit 112, a gesture information storage unit 113, an image capturing unit 121, an operation signal receiving unit 122, an identification unit 123, a role determination unit 124, a synthetic image generation unit 125, a history record unit 126 and a projection control unit 127.

The role determination storage unit 111 associates and stores a gesture and a role which are used to determine a role of a user who operates the operating device. FIG. 3 is a view illustrating an example of information stored in the role determination storage unit 111. As illustrated in FIG. 3, the role determination storage unit 111 associates and stores a "gesture" using each operating device in response to the motion of light and a "role" of a user matching the gesture during a conference. With one example, the role determination storage unit 111 associates and stores a role "facilitator" and a circle gesture. With another example, the role determination storage unit 111 associates and stores a role "presenter" and a square gesture. This role determination storage unit 111 is used to determine a role of a user who uses each operating device before a conference starts. When, for example, a gesture using the operating device is the circle gesture, the role of the user who uses the operating device is determined as the "facilitator". In addition, a cross gesture is a gesture used to cancel a role which is determined once.

The image capturing unit 121 captures an image of a predetermined area including the projection area of the projecting device 20. More specifically, the image capturing unit 121 is a camera which captures an image of the predetermined area including the projection area on which light is emitted when each user operates each operating device, and outputs the motion of the captured light to the identification unit 123. The motion of light refers to, for example, a shape such as the above circle or square. In addition, the image capturing unit 121 may not be included in the information processing device 100, and may be provided separately as a camera connected to the information processing device 100 through the network or a camera connected to the information processing device 100 through, for example, a cable.

The operation signal receiving unit 122 receives an operation signal indicating that each operating device is operated, from each operating device. More specifically, the operation signal receiving unit 122 receives an operation signal transmitted from each operating device when, for example, lights emitted by operating the operating device 30 to the operating device 60 are moved, that is, when each operating device is operated by each user. This operation signal also includes, for example, identification information of the operating device. Further, the operation signal receiving unit 122 outputs the received operation signal to the identification unit 123.

To determine a role of each user in a conference before the conference starts, the identification unit 123 instructs the synthetic image generation unit 125 to output an image (registration screen) to determine the role of each user, and outputs the gesture in response to the motion of light and the operation signal to the role determination unit 124. By this means, the synthetic image generation unit 125 which receives an instruction of outputting the registration screen performs control of projecting the registration screen on the projecting device 20 through the projection control unit 127. Further, the role determination unit 124 determines the role of each user who uses each operating device by acquiring from the role determination storage unit 111 the role associated with the gesture output from the identification unit 123, and stores the determined role in the role storage unit 112 together with identification information of each operating device. In addition, the determined role is reflected in the registration screen by the synthetic image generation unit 125 every time.

FIG. 4 is a view illustrating an example of the registration screen. As illustrated in FIG. 4, the registration screen includes information to specify roles of participants at a conference, and registration results of specified roles and a gesture which triggers a start of the conference. As described above, the synthetic image generation unit 125 which received an instruction from the identification unit 123 projects this registration screen on, for example, the screen by performing control of projecting the registration screen on the projecting device 20 through the projection control unit 127.

Each user makes a motion of registering the role of each user by checking the registration screen projected on the screen and operating the operating device which each user has based on this registration screen. With an example, the role of the user who makes the circle gesture is the "facilitator", the role of the user who makes the square gesture is the "presenter" and the role of the user who makes a triangle gesture is the "pointer". Further, a user who makes a wrong gesture upon registration of a role makes the cross gesture (cancel) and makes a gesture associated with an intended role again. By this means, identification information "1004" of the operating device 60 of the "facilitator", identification information "1001" of the operating device 50 of the "presenter", identification information "1002" of the operating device 30 of the "pointer" and identification information "1003" of the operating device 40 are reflected in a registration result. Meanwhile, when there is an operating device which is not used, the operating device is displayed as “unregistered” in the registration result. Subsequently, when a slash gesture for starting the conference is made using the operating device 60 corresponding to the facilitator, the conference is started.

The roles determined in this way are stored in the role storage unit 112 by the role determination unit 124. FIG. 5 is a view illustrating an example of information stored in the role storage unit 112. As illustrated in FIG. 5, as a result of role determination by the role determination unit 124, the role storage unit 112 associates and stores an “operating device ID” which is identification information of the operating device and a “role” of a user who uses the determined operating device. With an example, the role storage unit 112 associates and stores the operating device ID “1001 (operating device 50)” and the role “presenter”.

The gesture information storage unit 113 associates and stores, for example, the gesture and the attribute of the gesture per role of a user during the conference. In addition, the gesture information storage unit 113 is an example of an operation information storage unit. FIG. 6 is a view illustrating an example of information stored in the gesture information storage unit 113 according to the first embodiment. As illustrated in FIG. 6, the gesture information storage unit 113 associates and stores an “attribute” representing, for example, content or quality of a gesture, a “use frequency” representing the frequency of use of the gesture, a “role of user” representing the role of the user who uses the gesture and a “gesture” per role of the user during the conference. Further, the gesture information storage unit 113 further stores for the role “pointer” a “marking color” representing a color for marking and reflecting a pointed-out matter in an image which is being projected. In addition, details of reflection of the pointed-out matter will be described below.

With an example, the gesture information storage unit 113 associates and stores an attribute “correct”, a use frequency “middle”, a role of a user “pointer”, the gesture “o” and a marking color “blue” as gesture information for the pointer. Further, the gesture information storage unit 113 associates and stores an attribute “page turn”, a use frequency “high”, a role of a user “presenter” and a right-arrow gesture as gesture information for the presenter. Furthermore, the gesture information storage unit 113 associates and stores an attribute “start”, a use frequency “low”, a role of a user “facilitator” and the slash gesture as gesture information for the facilitator.

Hereinafter, a case will be described where the facilitator makes a gesture of starting a conference. The identification unit 123 receives the operation signal from the operating device 60 corresponding to the facilitator through the operation signal receiving unit 122, and receives the slash gesture using the operating device 60 from the image capturing unit 121. In this case, the identification unit 123 acquires the role “facilitator” from the role storage unit 112 based on the operating device ID included in the operation signal, and acquires the attribute “start” of the slash gesture associated with the role “facilitator” from the gesture information storage unit 113. By this means, the identification unit 123 identifies that the facilitator using the operating device 60 makes a gesture of starting the conference.

Further, the identification unit 123 notifies the start of the conference to the synthetic image generation unit 125, and notifies the history record unit 126 that generation of minute data is started. Furthermore, when notifying the start of the conference to the synthetic image generation unit 125, the identification unit 123 notifies the gesture which can perform an operation during a presentation of a presentation material and the attribute of the gesture per role.

The synthetic image generation unit 125 which received a notice of the start of the conference from the identification unit 123 acquires the presentation material from another device such as a user PC or a predetermined storage device, generates a synthetic image obtained by synthesizing an image of the presentation material and an image representing the gesture which can perform an operation during the presentation and an attribute of the gesture per role, and instructs the projection control unit 127 to project the synthetic image. By this means, the projection control unit 127 performs control of projecting the synthetic image on the projecting device 20. Meanwhile, the history record unit 126 which received a notice that generation of minute data is started from the identification unit 123 acquires a time stamp in this case, and starts generating the minute data.

Figure 7:
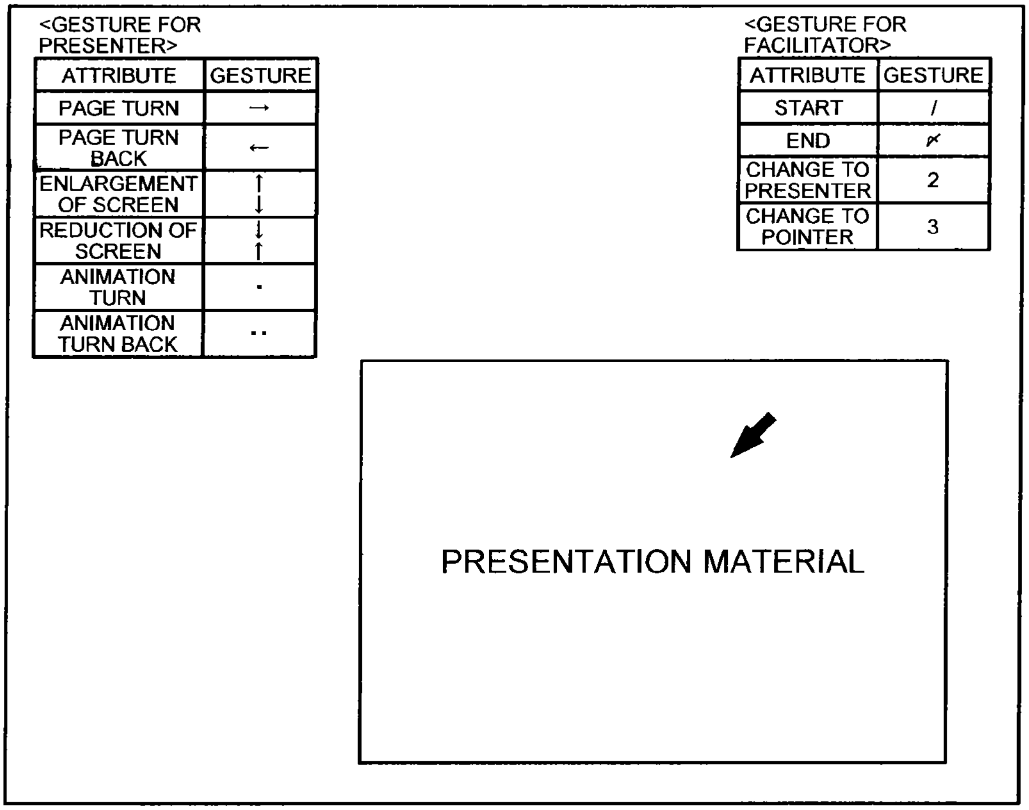
FIG. 7 is a view illustrating an example of an image projected on a screen during a presentation.

FIG. 7 is a view illustrating an example of an image projected on a screen during a presentation. As illustrated in FIG. 7, an image projected on the screen during the presentation includes a presentation material explained by the presenter during the presentation, a gesture and an attribute for the presenter and a gesture and an attribute for the facilitator. The presenter explains the presentation material while making a gesture operation such as “page turn” or “enlargement of screen” based on an image projected on the screen.

Hereinafter, a case will be described where the presenter makes a gesture of “page turn”. The identification unit 123 receives the operation signal from the operating device 50 corresponding to the presenter through the operation signal receiving unit 122, and receives the right-arrow gesture using the operating device 50 from the image capturing unit 121. In this case, the identification unit 123 acquires the role “presenter” from the role storage unit 112 based on the operating device ID included in the operation signal, and acquires the attribute “page turn” of the right-arrow gesture associated with the role “presenter” from the gesture information storage unit 113. By this means, the identification unit 123 identifies that the presenter using the operating device 50 makes a gesture of turning a page of the presentation material.

Further, the identification unit 123 notifies the synthetic image generation unit 125 that a page is turned, and notifies generation of minute data which records that the presenter made the gesture operation of turning the page, to the history record unit 126.

The synthetic image generation unit 125 which received a notice of page turn from the identification unit 123 changes the presentation material which is being projected to a next page, generates a synthetic image obtained by synthesizing an image of the presentation material and an image representing a gesture which can perform an operation during the presentation and an attribute of the gesture per role, and instructs the projection control unit 127 to project the synthetic image. By this means, the projection control unit 127 performs control of projecting the synthetic image on the projecting device 20. Meanwhile, the history record unit 126 which received a notice of generation of minute data from the identification unit 123 acquires a time stamp in this case, and generates the minute data which records that the presenter turned a page. In addition, when the presenter makes not only a gesture operation of “page turn” but also another gesture during the presentation, the same processing as the above is performed.

That is, while the presenter explains the presentation material, a gesture of the pointer is not received. To accept the gesture of the pointer, the facilitator makes a gesture “3 (change to pointer)”.

Hereinafter, a case will be described where the facilitator makes a gesture of “change to pointer”. The identification unit 123 receives the operation signal from the operating device 60 corresponding to the facilitator through the operation signal receiving unit 122, and receives the gesture "3" using the operating device 60 from the image capturing unit 121. In this case, the identification unit 123 acquires the role "facilitator" from the role storage unit 112 based on the operating device ID included in the operation signal, and acquires the attribute "change to pointer" of the gesture "3" associated with the role "facilitator" from the gesture information storage unit 113. By this means, the identification unit 123 identifies that the facilitator using the operating device 60 made a gesture of changing from the presenter to the pointer.

Further, the identification unit 123 notifies that the gesture operation is changed to the pointer, to the synthetic image generation unit 125, and notifies generation of minute data which records that the facilitator made the gesture operation of changing to the pointer, to the history record unit 126.

The synthetic image generation unit 125 which received a notice that the gesture operation is changed to the pointer from the identification unit 123 generates a synthetic image obtained by synthesizing an image of the presentation material which is being projected and an image representing a gesture which can perform an operation during pointing out to the pointer and an attribute of the gesture, and instructs the projection control unit 127 to project the synthetic image. By this means, the projection control unit 127 performs control of projecting the synthetic image on the projecting device 20. Meanwhile, the history record unit 126 which received a notice of generation of minute data from the identification unit 123 acquires a time stamp in this case and generates the minute data which records that the facilitator changes the gesture operation to the pointer.

Figure 8:
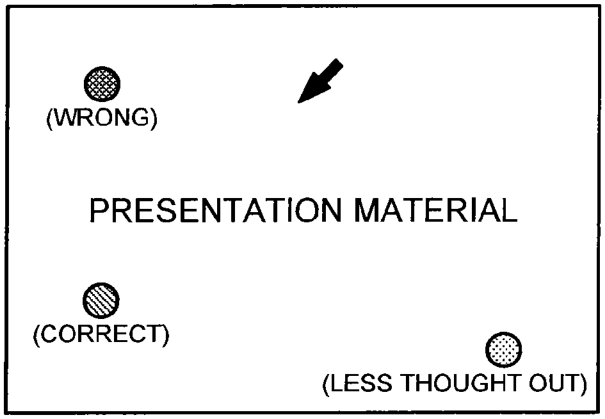
FIG. 8 is a view illustrating an example of an image projected on a screen during pointing out.

FIG. 8 is a view illustrating an example of an image projected on the screen during pointing out. As illustrated in FIG. 8, an image projected on the screen during the pointing out includes a presentation material explained by the presenter during the presentation, a gesture and an attribute for the pointer, and a gesture and an attribute for the facilitator. The pointer performs pointing out to the presentation material while making a gesture operation such as "correct" or "wrong" based on the image projected on the screen.

Hereinafter, a case will be described where the pointer makes a gesture of "wrong". The identification unit 123 receives the operation signal from the operating device 30 corresponding to the pointer through the operation signal receiving unit 122, and receives a tick gesture using the operating device 30 and the pointed-out position on the screen from the image capturing unit 121. In this case, the identification unit 123 acquires the role "pointer" from the role storage unit 112 based on the operating device ID included in the operation signal, and acquires the attribute "wrong" of the tick gesture associated with the role "pointer" and a marking color "red" from the gesture information storage unit 113. By this means, the identification unit 123 identifies which part of the presentation material the pointer using the operating device 30 makes a gesture of pointing out wrong.

Further, the identification unit 123 notifies pointed-out content, a pointed-out position and a marking color to the synthetic image generation unit 125, and notifies generation of minute data which records pointed-out content and the pointed-out position by the pointer, to the history record unit 126.

The synthetic image generation unit 125 which receives the notice of the pointed-out content, the pointed-out position and the marking color from the identification unit 123 generates a synthetic image obtained by synthesizing an image of the presentation material which is being projected and an image representing a portion pointed out by the pointer as pointed-out content "wrong" and marked by a marking color "red" in a predetermined shape, and instructs the projection control unit 127 to project the synthetic image. By this means, the projection control unit 127 performs control of projecting the synthetic image on the projecting device 20. Meanwhile, the history record unit 126 which received a notice of generation of minute data from the identification unit 123 acquires a time stamp in this case, and generates the minute data which records information indicating the pointed-out matter (pointed-out portion and pointed-out content) by the pointer. In addition, even when the pointer makes not only a gesture operation of "wrong" but also another gesture during pointing out, the same processing as the above is performed. FIG. 8 illustrates a case where the pointer makes pointing out "wrong", "correct" and "less thought out" with respect to a predetermined portion. Further, when the pointer finishes pointing out and the presenter continues the presentation, the facilitator performs a gesture "2 (change to presenter)".

Furthermore, a case has been described with the above example where the pointer makes the tick gesture and the identification unit 123 acquires the attribute "wrong" of the tick gesture from the gesture information storage unit 113. Upon identification of a gesture, when there are a plurality of gesture candidates, the identification unit 123 acquires an attribute associated with a gesture of a higher "use frequency" from the gesture information storage unit 113. Citing the above example, when the pointer makes a gesture similar to both of the tick gesture and a less-than sign gesture, there are gesture candidates of the tick and the less-than sign, and the identification unit 123 refers to the gesture information storage unit 113 and acquires an attribute "addition of explanation" associated with the less-than sign gesture of a higher use frequency based on the use frequencies of the tick (use frequency: middle) and the less-than sign (use frequency: high) of the respective gestures. In addition, the same processing as the above is performed with respect to not only a gesture of the pointer but also gestures of the presenter or the facilitator.

FIG. 9 is a view illustrating an example of minute data according to the first embodiment. As illustrated in FIG. 9, the minute data includes roles of participants who participated in a conference, a start time and an end time of the conference, an image in which a pointed-out matter is marked in each presentation material and description of the pointed-out matter. Among these, the image in which the pointed-out matter is marked and the description of the pointed-out matter are numbered pointing-out numbers such as "pointed-out matter 1-1" in order of pointing out and are associated. As described above, the history record unit 126 generates minute data every time, for example, upon start of a conference, during the presentation, upon switching of a gesture operation and during pointing out according to every projected state of a synthetic image on the projecting device 20.

Entire Processing Flow

Figure 10:
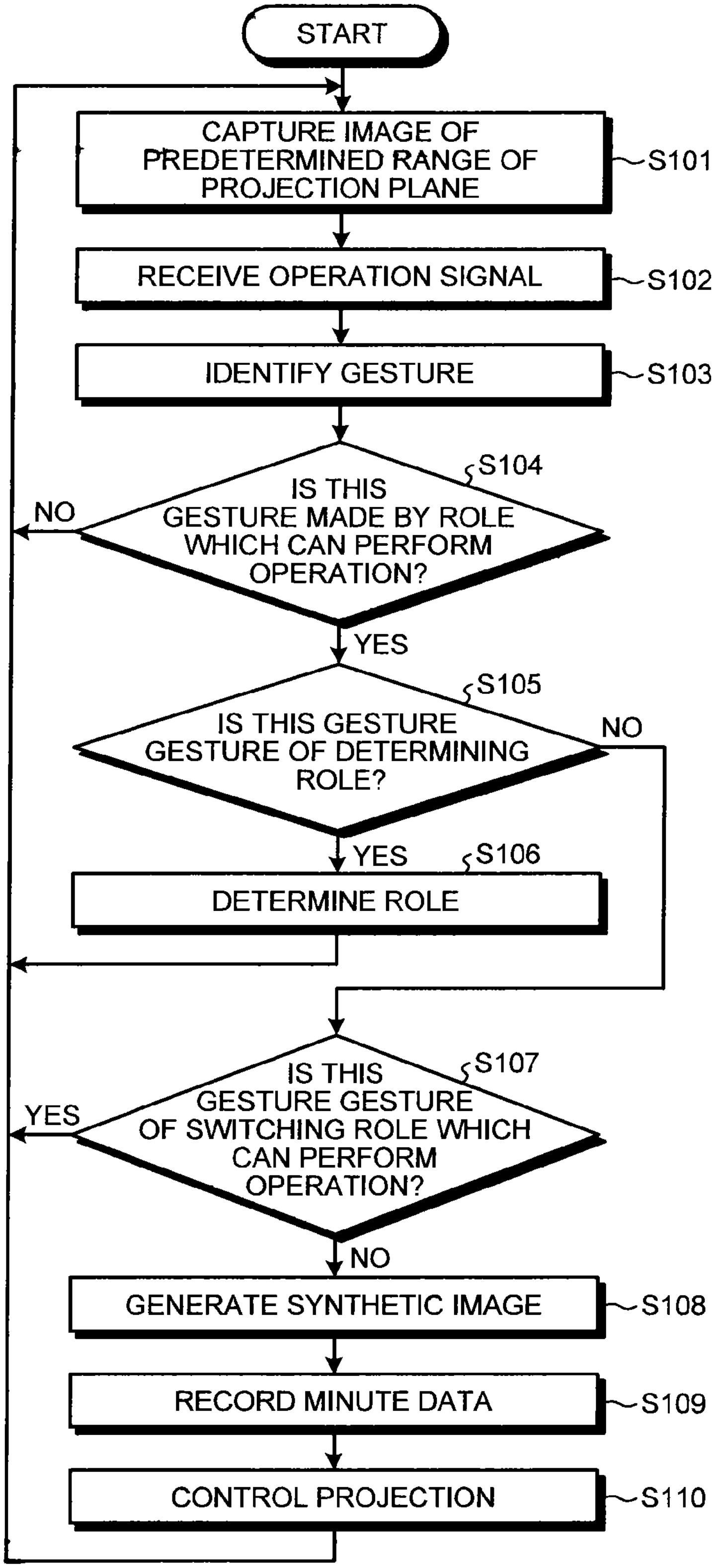
FIG. 10 is a flowchart illustrating an example of a flow of entire processing according to the first embodiment.

Next, a flow of entire processing according to the first embodiment will be described using FIG. 10. FIG. 10 is a flowchart illustrating an example of the flow of the entire processing according to the first embodiment.

As illustrated in FIG. 10, the image capturing unit 121 captures an image of the predetermined area including the screen emitted by light when each user operates each operating device (step S101). Further, when, for example, light emitted to the predetermined area is moved, that is, when each operating device is operated, the operation signal receiving unit 122 receives an operation signal transmitted from each operating device (step S102). Furthermore, the identification unit 123 identifies what gesture is made using an operating device corresponding to any role, based on the motion of light the image of which is captured by the image capturing unit 121 and the operation signal received by the operation signal receiving unit 122 (step S103).

Still further, when deciding that the gesture is made by a role which can perform an operation (step S104: Yes), the identification unit 123 decides whether or not a gesture is a gesture of determining a role (step S105). Whether or not the gesture is a gesture made by a role which can perform an operation is decided based on whether or not the role corresponds to the role which can perform an operation in response to a gesture operation switched by the facilitator during, for example, the presentation or pointing out. By this means, when deciding that the gesture is not a gesture made by a role which can perform an operation (step S104: No), the identification unit 123 executes processing in step S101 again. Further, whether or not a gesture is a gesture of determining a role is decided based on whether or not a state is a state before the conference starts, that is, whether or not information about a role is not stored in the role storage unit 112.

In this case, when the identification unit 123 decides that the gesture is a gesture of determining a role (step S105: Yes), the role determination unit 124 acquires the role associated with the gesture from the role determination storage unit 111, and determines the role of the user who uses the operating device (step S106). Meanwhile, when deciding that the gesture is not a gesture of determining a role (step S105: No), the identification unit 123 decides whether or not the gesture is a gesture of switching a role which can perform an operation (step S107). Whether or not the gesture is the gesture of switching the role which can perform an operation is decided based on whether or not the facilitator makes a gesture such as "change to pointer" or "change to presenter" during the conference.

In this case, when deciding that the gesture is the gesture of switching the role which can perform an operation (step S107: Yes), the identification unit 123 notifies the synthetic image generation unit 125 that the gesture operation is changed to the pointer or the presenter, and notifies generation of minute data which records that the gesture operation of changing the gesture operation to the pointer or the presenter was made, to the history record unit 126. By this means, the synthetic image generation unit 125 which received the notice that the gesture operation is changed to the pointer or the presenter from the identification unit 123 generates a synthetic image obtained by synthesizing an image of the presentation material which is being projected and an image representing a gesture of the pointer or the presenter who can perform an operation and an attribute of the gesture, and instructs the projection control unit 127 to project the synthetic image. Further, the projection control unit 127 performs control of projecting the synthetic image on the projecting device 20. In addition, the history record unit 126 which received the notice of generation of the minute data from the identification unit 123 acquires a time stamp in this case, and generates minute data which records that the facilitator changed the gesture operation to the pointer or the presenter.

Meanwhile, when the identification unit 123 decides that the gesture is not the gesture of switching the role which can perform an operation (step S107: No), the synthetic image generation unit 125 generates a synthetic image which reflects the attribute of the gesture of the presenter or the pointer in the image (step S108). Further, the history record unit 126 generates minute data including the synthetic image generated by the synthetic image generation unit 125, description of the role and description of the attribute (step S109). Furthermore, the projection control unit 127 performs control of projecting the synthetic image generated by the synthetic image generation unit 125 on the projecting device 20 (step S110).

Participant Registering Sequence

Figure 11:
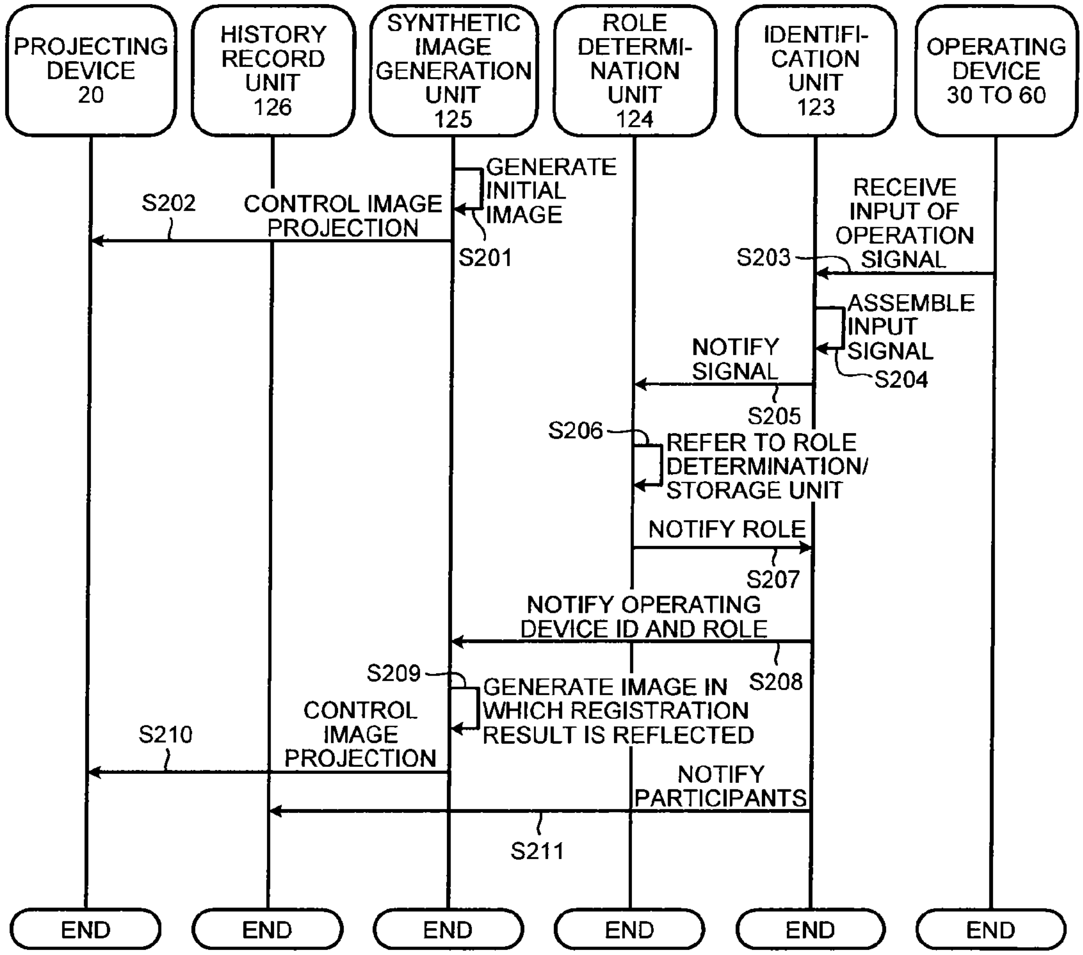
FIG. 11 is a processing sequence diagram illustrating an example of participant registration.

Next, a processing sequence of registering participants will be described using FIG. 11. FIG. 11 is a processing sequence diagram illustrating an example of participant registration.

As illustrated in FIG. 11, the synthetic image generation unit 125 generates an initial image which is a registration screen according to an instruction from the identification unit 123 before the conference starts (step S201). Further, the synthetic image generation unit 125 performs control of projecting the generated initial image on the projecting device 20 through the projection control unit 127 (step S202). By this means, the registration screen illustrated in FIG. 4 is projected on the screen.

Further, according to an operation of each user using the operating device 30 to the operating device 60, the operation signal is input to the identification unit 123 through the operation signal receiving unit 122 (step S203). In this case, the identification unit 123 also receives an input of the motion of light the image of which is captured by the image capturing unit 121. Further, the identification unit 123 assembles the input signal (the motion of light) (step S204). Subsequently, the identification unit 123 outputs the gesture in response to the motion of light and the operation signal to the role determination unit 124 (step S205). In addition, details of assembly of the signal will be described below.

Further, the role determination unit 124 determines the role of each user using each operating device by acquiring the role associated with the gesture output from the identification unit 123 from the role determination storage unit 111 (step S206). Furthermore, the role determination unit 124 notifies the role of each user using each determined operating device to the identification unit 123 (step S207).

Still further, the identification unit 123 notifies the role notified by the role determination unit 124 and each operating device ID to the synthetic image generation unit 125 (step S208). By this means, the synthetic image generation unit 125 generates an image in which a registration result of the role notified by the identification unit 123 and each operating device ID is reflected (step S209). Further, the synthetic image generation unit 125 performs control of projecting the generated image on the projecting device 20 through the projection control unit 127 (step S210). Furthermore, the identification unit 123 notifies the history record unit 126 of participants (the facilitator, the presenter, the pointer A and the pointer B, for example) used to generate minute data (step S211).

Participant Reregistering Sequence

Figure 12:
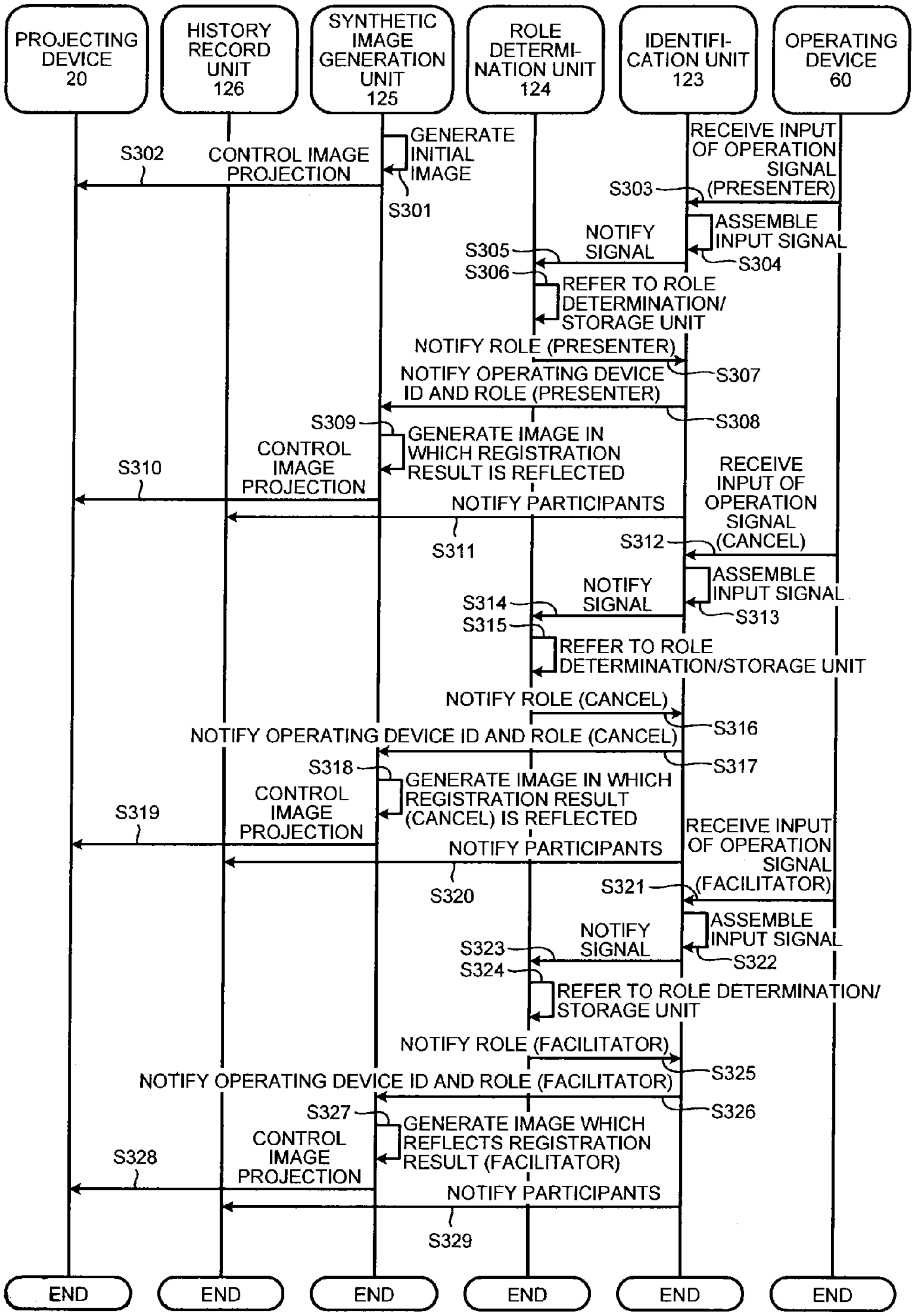
FIG. 12 is a processing sequence diagram illustrating an example of participant reregistration.

Next, a processing sequence of reregistering participants will be described using FIG. 12. FIG. 12 is a processing sequence diagram illustrating an example of participant reregistration. In addition, a case will be described with the example of participant reregistration illustrated in FIG. 12 where the user using the operating device 60 registers participation as the presenter, then cancels the participation and reregisters the participation as the facilitator.

As illustrated in FIG. 12, the synthetic image generation unit 125 generates an initial image which is the registration screen according to an instruction from the identification unit 123 before the conference starts (step S301). Further, the synthetic image generation unit 125 performs control of projecting the generated initial image on the projecting device 20 through the projection control unit 127 (step S302).

Furthermore, according to an operation of the user using the operating device 60, the operation signal is input to the identification unit 123 through the operation signal receiving unit 122 (step S303). In this case, the identification unit 123 also receives an input of the square gesture (presenter) in response to the motion of light the image of which is captured by the image capturing unit 121. Further, the identification unit 123 assembles the input signal (the motion of light) (step S304). Subsequently, the identification unit 123 outputs the square gesture and the operation signal to the role determination unit 124 (step S305).

Further, the role determination unit 124 determines the role of the user using the operating device 60 by acquiring the role "presenter" associated with the square gesture output from the identification unit 123, from the role determination storage unit 111 (step S306). Furthermore, the role determination unit 124 notifies the identification unit 123 of the role "presenter" of the user using the determined operating device 60 (step S307).

Still further, the identification unit 123 notifies the role "presenter" notified by the role determination unit 124 and the operating device ID "1004" of the operating device 60 to the synthetic image generation unit 125 (step S308). By this means, the synthetic image generation unit 125 generates an image in which a registration result of the role "presenter" notified by the identification unit 123 and the operating device ID "1004 (operating device 60)" is reflected (step S309). Further, the synthetic image generation unit 125 performs control of projecting the generated image on the projecting device 20 through the projection control unit 127 (step S310). Furthermore, the identification unit 123 notifies the history record unit 126 of the participant (presenter) who generates minute data (step S311).

Still further, according to an operation of the user (a user registered as the presenter) using the operating device 60, the operation signal is input to the identification unit 123 through the operation signal receiving unit 122 (step S312). In this case, the identification unit 123 also receives an input of the cross gesture (cancel) in response to the motion of light the image of which is captured by the image capturing unit 121. Further, the identification unit 123 assembles the input signal (the motion of light) (step S313). Subsequently, the identification unit 123 outputs the cross gesture and the operation signal to the role determination unit 124 (step S314).

Further, the role determination unit 124 determines the role of the user using the operating device 60 by acquiring from the role determination storage unit 111 the role "cancel" associated with the cross gesture output from the identification unit 123 (step S315). Furthermore, the role determination unit 124 notifies the identification unit 123 of the role "cancel" of the user using the determined operating device 60 (step S316).

Still further, the identification unit 123 notifies the synthetic image generation unit 125 of the role "cancel" notified by the role determination unit 124 and the operating device ID "1004" of the operating device 60 (step S317). By this means, the synthetic image generation unit 125 generates an image in which a registration result of the role "cancel" notified by the identification unit 123 and the operating device ID "1004 (operating device 60)" is reflected (step S318). The image generated in this case is an image in which the role of the operating device 60 as the presenter registered in a previous stage is deleted, and the role of the operating device 60 is shown as "unregistered". Further, the synthetic image generation unit 125 performs control of projecting the generated image on the projecting device 20 through the projection control unit 127 (step S319). Furthermore, the identification unit 123 notifies the history record unit 126 of the participant (cancellation of presenter) who generates minute data (step S320).

Still further, according to an operation of the user (a user makes cancellation to be the presenter) using the operating device 60, the operation signal is input to the identification unit 123 through the operation signal receiving unit 122 (step S321). In this case, the identification unit 123 also receives an input of the circle gesture (facilitator) in response to the motion of light the image of which is captured by the image capturing unit 121. Further, the identification unit 123 assembles the input signal (the motion of light) (step S322). Subsequently, the identification unit 123 outputs the circle gesture and the operation signal to the role determination unit 124 (step S323).

Further, the role determination unit 124 determines the role of the user using the operating device 60 by acquiring from the role determination storage unit 111 the role "facilitator" associated with the circle gesture output from the identification unit 123 (step S324). Furthermore, the role determination unit 124 notifies the identification unit 123 of the role "facilitator" of the user using the determined operating device 60 (step S325).

Still further, the identification unit 123 notifies the synthetic image generation unit 125 of the role "facilitator" notified by the role determination unit 124 and the operating device ID "1004" of the operating device 60 (step S326). By this means, the synthetic image generation unit 125 generates an image in which a registration result of the role "facilitator" notified by the identification unit 123 and the operating device ID "1004 (operating device 60)" is reflected (step S327). Further, the synthetic image generation unit 125 performs control of projecting the generated image on the projecting device 20 through the projection control unit 127 (step S328). Furthermore, the identification unit 123 notifies the history record unit 126 of the participant (facilitator) who generates minute data (step S329).

Conference Starting Sequence

Figure 13:
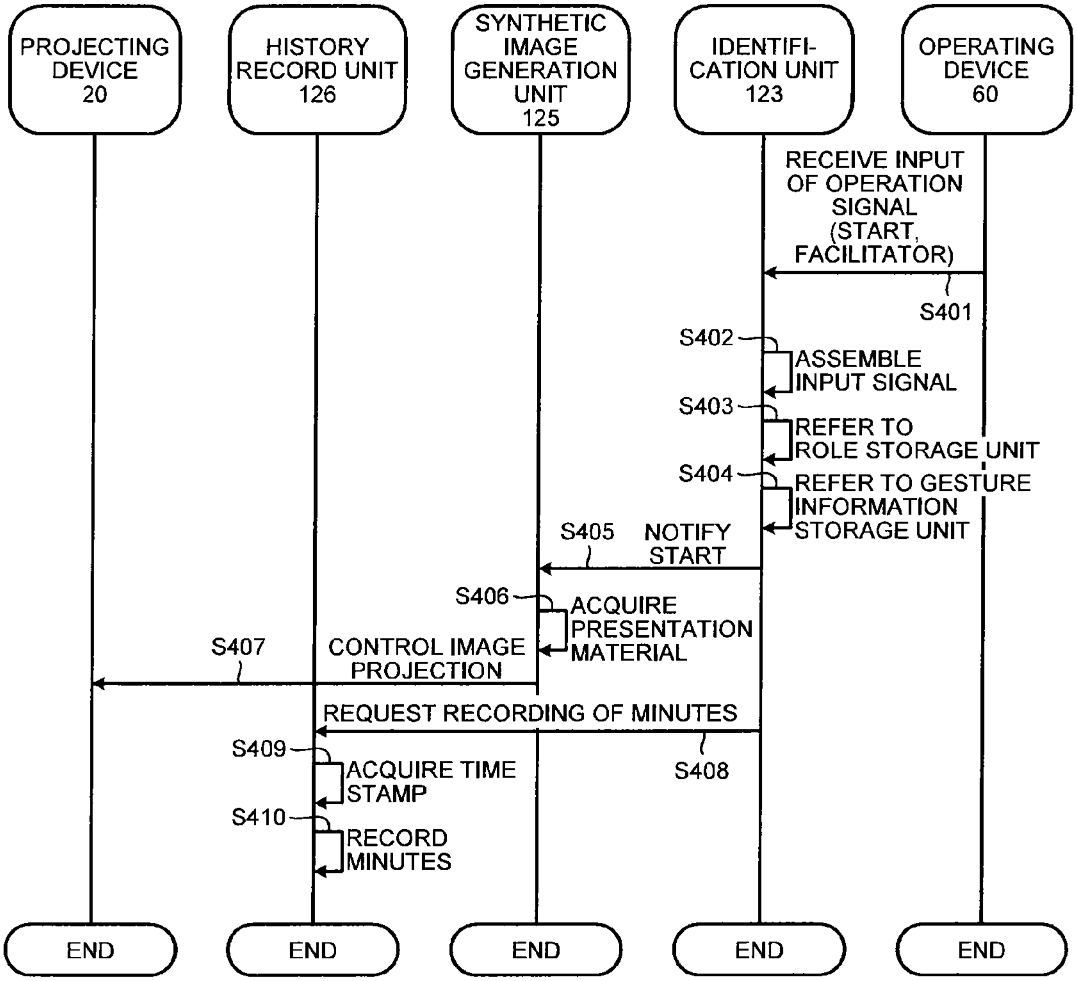
FIG. 13 is a processing sequence diagram illustrating an example of a start of a conference.

Next, a processing sequence of starting a conference will be described using FIG. 13. FIG. 13 is a processing sequence diagram illustrating an example of a start of a conference.

As illustrated in FIG. 13, according to an operation of the user using the operating device 60, the operation signal is input to the identification unit 123 through the operation signal receiving unit 122 (step S401). In this case, the identification unit 123 also receives an input of the slash gesture (start) in response to the motion of light the image of which is captured by the image capturing unit 121. Further, the identification unit 123 assembles the input signal (the motion of light) (step S402). Subsequently, the identification unit 123 acquires the role "facilitator" referring to the role storage unit 112 based on the operating device ID "1004" included in the operation signal (step S403). Further, the identification unit 123 acquires an attribute "start" of the slash gesture associated with the role "facilitator" referring to the gesture information storage unit 113 (step S404). By this means, the identification unit 123 identifies that a gesture of starting a conference was received from the user of the operating device 60 who is the facilitator. Subsequently, the identification unit 123 notifies the synthetic image generation unit 125 of the start of the conference (step S405).

Further, when receiving a notice of the start of the conference from the identification unit 123, the synthetic image generation unit 125 acquires the presentation material from another device such as a user PC or a predetermined storage device (step S406). Furthermore, the synthetic image generation unit 125 generates a synthetic image obtained by synthesizing an image of the presentation material and an image representing the gesture which can perform an operation during the presentation and an attribute of the gesture per role, and performs control of projecting the generated synthetic image on the projecting device 20 through the projection control unit 127 (step S407). Still further, the identification unit 123 requests the history record unit 126 to start generating minute data (step S408). By this means, the history record unit 126 acquires a time stamp in this case (step S409), and starts generating the minute data (step S410).

Sequence During Presentation

Figure 14:
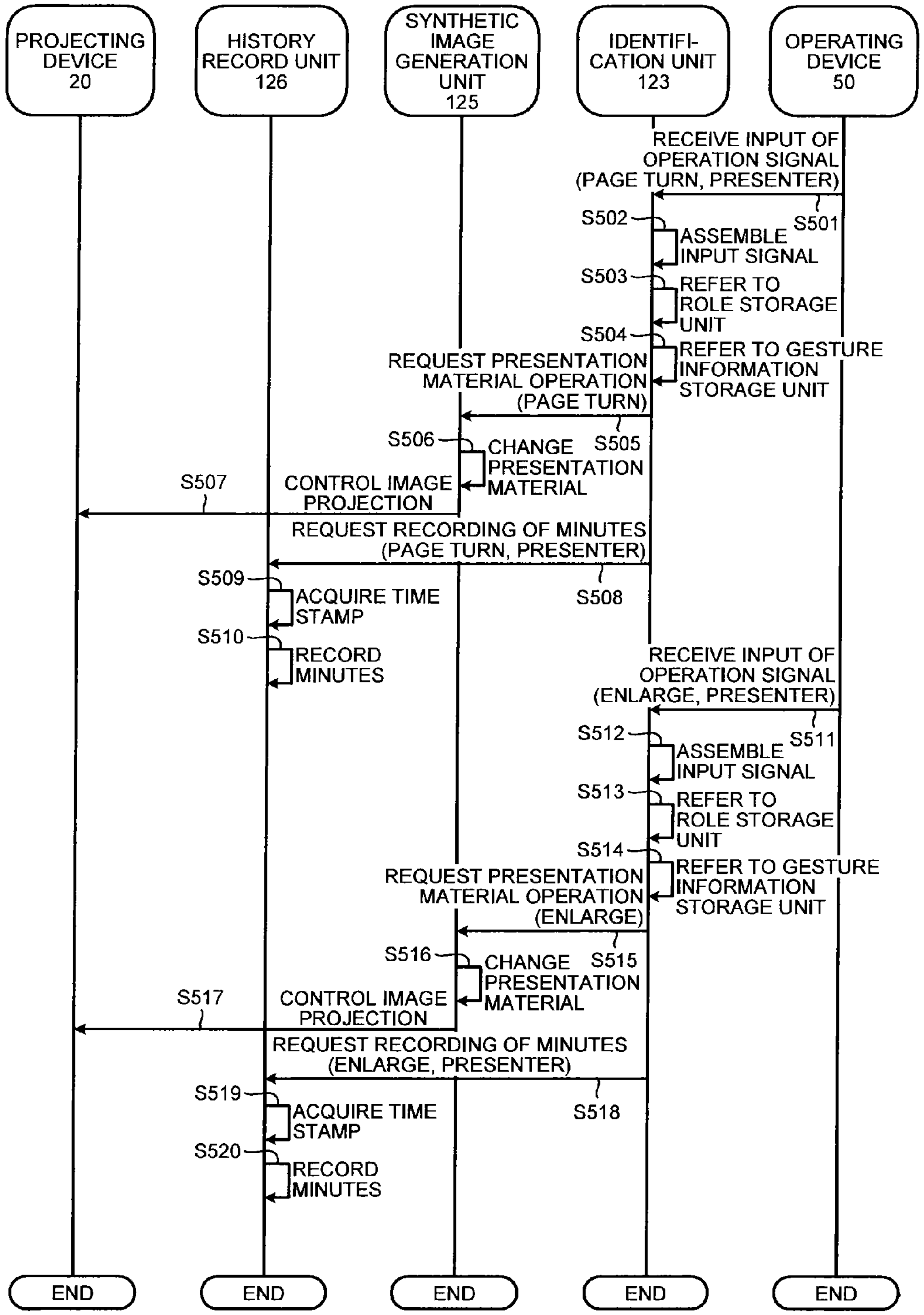
FIG. 14 is a processing sequence diagram illustrating an example during a presentation.

Next, a processing sequence during a presentation will be described using FIG. 14. FIG. 14 is a processing sequence diagram illustrating an example during a presentation.

As illustrated in FIG. 14, according to an operation of the user using the operating device 50, the operation signal is input to the identification unit 123 through the operation signal receiving unit 122 (step S501). In this case, the identification unit 123 also receives an input of the right-arrow gesture (page turn) in response to the motion of light the image of which is captured by the image capturing unit 121. Further, the identification unit 123 assembles the input signal (the motion of light) (step S502). Subsequently, the identification unit 123 acquires the role "presenter" referring to the role storage unit 112 based on the operating device ID "1001" included in the operation signal (step S503). Further, the identification unit 123 acquires an attribute "page turn" of the right-arrow gesture associated with the role "presenter" referring to the gesture information storage unit 113 (step S504). By this means, the identification unit 123 identifies that a gesture of turning a page of the presentation material was received from the user of the operating device 50 who is the presenter. Subsequently, the identification unit 123 notifies the synthetic image generation unit 125 that the page of the presentation material is turned (step S505).

Further, when receiving the notice that the page of the presentation material is turned, from the identification unit 123, the synthetic image generation unit 125 turns the page of the presentation material which is being projected and changes the presentation material (step S506). More specifically, the synthetic image generation unit 125 generates a synthetic image obtained by synthesizing an image in which the page of the presentation material which is being projected is turned and an image representing a gesture which can perform an operation during the presentation and an attribute of the gesture per role. Further, the synthetic image generation unit 125 performs control of projecting the generated synthetic image on the projecting device 20 through the projection control unit 127 (step S507). Furthermore, the identification unit 123 requests the history record unit 126 to generate minute data which records that the presenter turned the page (step S508). By this means, the history record unit 126 acquires a time stamp in this case (step S509), and generates the minute data (step S510).

Further, according to an operation of the user using the operating device 50, the operation signal is input to the identification unit 123 through the operation signal receiving unit 122 (step S511). In this case, the identification unit 123 also receives an input of an up-down-arrow gesture (enlargement of screen) in response to the motion of light the image of which is captured by the image capturing unit 121, and the position of an enlargement target. Further, the identification unit 123 assembles the input signal (the motion of light) (step S512). Subsequently, the identification unit 123 acquires the role "presenter" referring to the role storage unit 112 based on the operating device ID "1001" included in the operation signal (step S513). Further, the identification unit 123 acquires an attribute "enlargement of screen" of the up-down-arrow gesture associated with the role "presenter" referring to the gesture information storage unit 113 (step S514). By this means, the identification unit 123 identifies that a gesture of enlarging the screen of a predetermined position of the presentation material was received from the user of the operating device 50 who is the presenter. Subsequently, the identification unit 123 notifies that the screen of the predetermined position of the presentation material is enlarged to the synthetic image generation unit 125 (step S515).

Further, when receiving the notice that the screen of the predetermined position of the presentation material is enlarged, from the identification unit 123, the synthetic image generation unit 125 enlarges the screen of the predetermined position of the presentation material which is being projected and changes the presentation material (step S516). More specifically, the synthetic image generation unit 125 generates a synthetic image obtained by synthesizing an image in which the screen of the predetermined position of the presentation material which is being projected is enlarged and an image representing a gesture which can perform an operation during the presentation and an attribute of the gesture per role. Further, the synthetic image generation unit 125 performs control of projecting the generated synthetic image on the projecting device 20 through the projection control unit 127 (step S517). Furthermore, the identification unit 123 requests the history record unit 126 to generate minute data which records that the presenter enlarged the screen of the predetermined position of the presentation material (step S518). By this means, the history record unit 126 acquires a time stamp in this case (step S519), and generates the minute data (step S520).

Gesture Operation Switching Sequence

Figure 15:
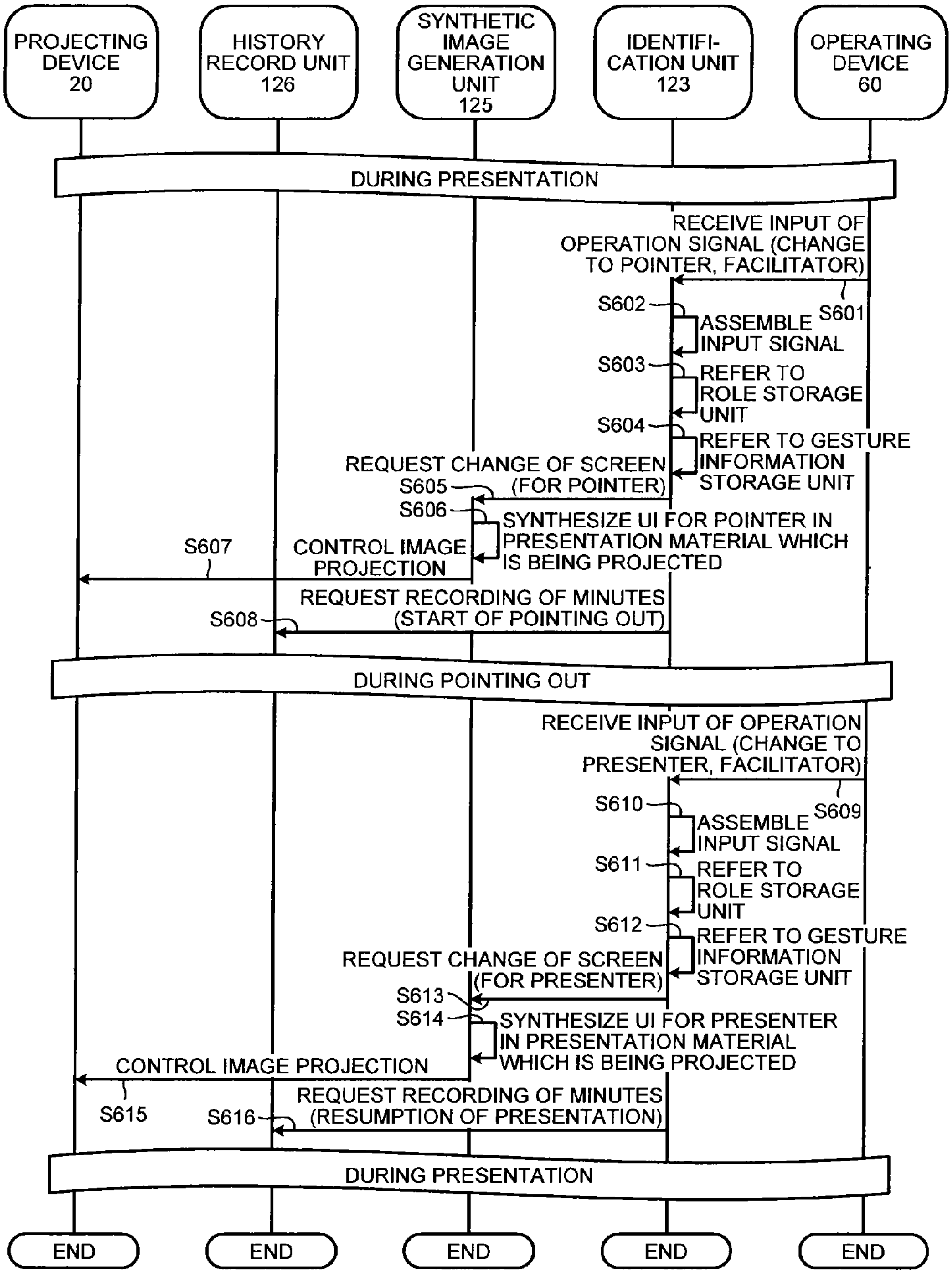
FIG. 15 is a processing sequence diagram illustrating an example of switching of a gesture operation.

Next, a processing sequence of switching a gesture operation will be described using FIG. 15. FIG. 15 is a processing sequence diagram illustrating an example of switching of a gesture operation.

As illustrated in FIG. 15, according to an operation of the user using the operating device 60, the operation signal is input to the identification unit 123 through the operation signal receiving unit 122 while the presenter makes a presentation of the presentation material (step S601). In this case, the identification unit 123 also receives an input of the gesture "3 (change to pointer)" in response to the motion of light the image of which is captured by the image capturing unit 121. Further, the identification unit 123 assembles the input signal (the motion of light) (step S602). Subsequently, the identification unit 123 acquires the role "facilitator" referring to the role storage unit 112 based on the operating device ID "1004" included in the operation signal (step S603). Further, the identification unit 123 acquires an attribute "change to pointer" of the gesture "3" associated with the role "facilitator" referring to the gesture information storage unit 113 (step S604). By this means, the identification unit 123 identifies that a gesture of changing a user who can perform a gesture operation from the presenter to the pointer was received from the user of the operating device 60 who is the facilitator. Subsequently, the user who can perform the gesture operation changes to the pointer, and then the identification unit 123 requests the synthetic image generation unit 125 to change the image for the presenter to an image representing a gesture and an attribute of the gesture for the pointer who can perform an operation during pointing out (step S605).

Further, when receiving the request of changing the image from the identification unit 123, the synthetic image generation unit 125 generates a synthetic image obtained by synthesizing an image of the presentation material which is being projected and an image which is an UI (User Interface) for the pointer and which represents the gesture and the attribute of the gesture for the pointer which can perform an operation during pointing out (step S606). Furthermore, the synthetic image generation unit 125 performs control of projecting the generated synthetic image on the projecting device 20 through the projection control unit 127 (step S607). Still further, the identification unit 123 requests the history record unit 126 to generate minute data which records that the pointers starts pointing out (step S608).

According to an operation of the user using the operating device 60, the operation signal is input to the identification unit 123 through the operation signal receiving unit 122 while the pointer performs pointing out to the presentation material (step S609). In this case, the identification unit 123 also receives an input of the gesture "2 (change to presenter)" in response to the motion of light the image of which is captured by the image capturing unit 121. Further, the identification unit 123 assembles the input signal (the motion of light) (step S610). Subsequently, the identification unit 123 acquires the role "facilitator" referring to the role storage unit 112 based on the operating device ID "1004" included in the operation signal (step S611). Further, the identification unit 123 acquires an attribute "change to presenter" of the gesture "2" associated with the role "facilitator" referring to the gesture information storage unit 113 (step S612). By this means, the identification unit 123 identifies that a gesture of changing a user who can perform a gesture operation from the pointer to the presenter was received from the user of the operating device 60 who is the facilitator. Subsequently, the user who can perform the gesture operation changes to the presenter, and then the identification unit 123 requests the synthetic image generation unit 125 to change the image for the pointer to an image representing a gesture and an attribute of the gesture for the presenter who can perform an operation during the presentation (step S613).

Further, when receiving the request of changing the image from the identification unit 123, the synthetic image generation unit 125 generates a synthetic image obtained by synthesizing an image of the presentation material which is being projected and an image which is an UI for the presenter and which represents the gesture and the attribute of the gesture for the presenter who can perform an operation during the presentation (step S614). Furthermore, the synthetic image generation unit 125 performs control of projecting the generated synthetic image on the projecting device 20 through the projection control unit 127 (step S615). Still further, the identification unit 123 requests the history record unit 126 to generate minute data which records that the presenter resumes a presentation of the presentation material (step S616).

Sequence During Pointing Out

Figure 16:
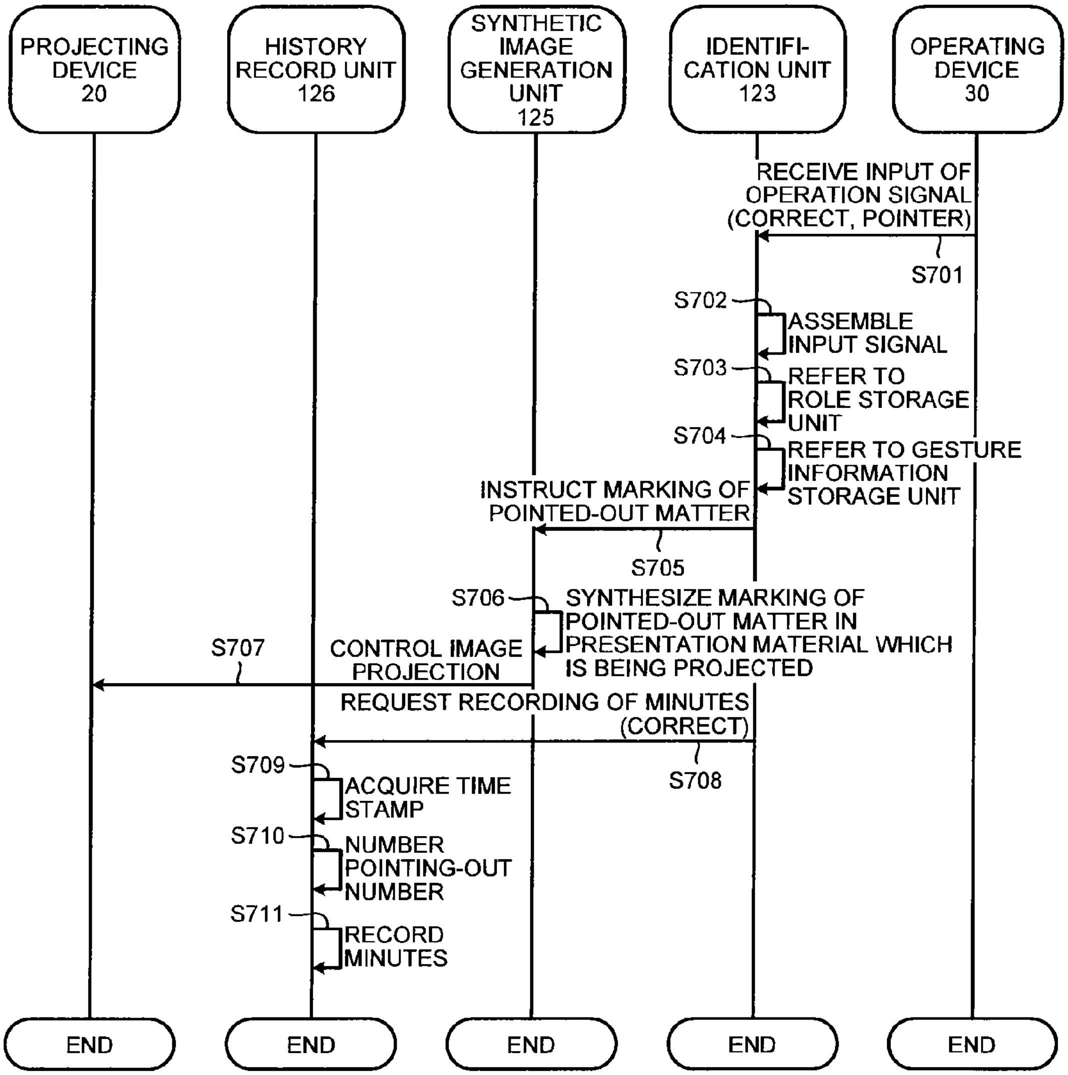
FIG. 16 is a processing sequence diagram illustrating an example during pointing out.

Next, a processing sequence during pointing out will be described using FIG. 16. FIG. 16 is a processing sequence diagram illustrating an example during pointing out. In addition, a case will be described using FIG. 16 where the user who is the "pointer A" operates the operating device 30.

As illustrated in FIG. 16, according to an operation of the user using the operating device 30, the operation signal is input to the identification unit 123 through the operation signal receiving unit 122 while the pointer performs pointing out to the presentation material (step S701). In this case, the identification unit 123 also receives a circle gesture (correct) in response to the motion of light the image of which is captured by the image capturing unit 121. Further, the identification unit 123 assembles the input signal (the motion of light) (step S702). Subsequently, the identification unit 123 acquires the role "pointer" referring to the role storage unit 112 based on the operating device ID "1002" included in the operation signal (step S703). Further, the identification unit 123 acquires an attribute "correct" of the circle gesture associated with the role "pointer" and the marking color "blue" referring to the gesture information storage unit 113 (step S704). By this means, the identification unit 123 identifies that a gesture representing a pointed-out matter "correct" of a predetermined portion was received from the user of the operating device 30 who is the pointer. Subsequently, the identification unit 123 instructs the synthetic image generation unit 125 to change the pointed-out matter "correct" of the predetermined portion to an image marked by blue (step S705).

Further, when receiving an instruction of changing the image from the identification unit 123, the synthetic image generation unit 125 generates a synthetic image obtained by synthesizing an image of the presentation material which is being projected and an image representing the predetermined portion marked by blue and the pointed-out matter "correct" (step S706). Furthermore, the synthetic image generation unit 125 performs control of projecting the generated synthetic image on the projecting device 20 through the projection control unit 127 (step S707). Still further, the identification unit 123 requests the history record unit 126 to generate minute data which records pointed-out matters of the pointer on the presentation material (step S708). By this means, the history record unit 126 acquires a time stamp in this case (step S709), numbers pointing-out numbers (step S710) and generates the minute data (step S711).

Signal Assembling Flow

Figure 17:
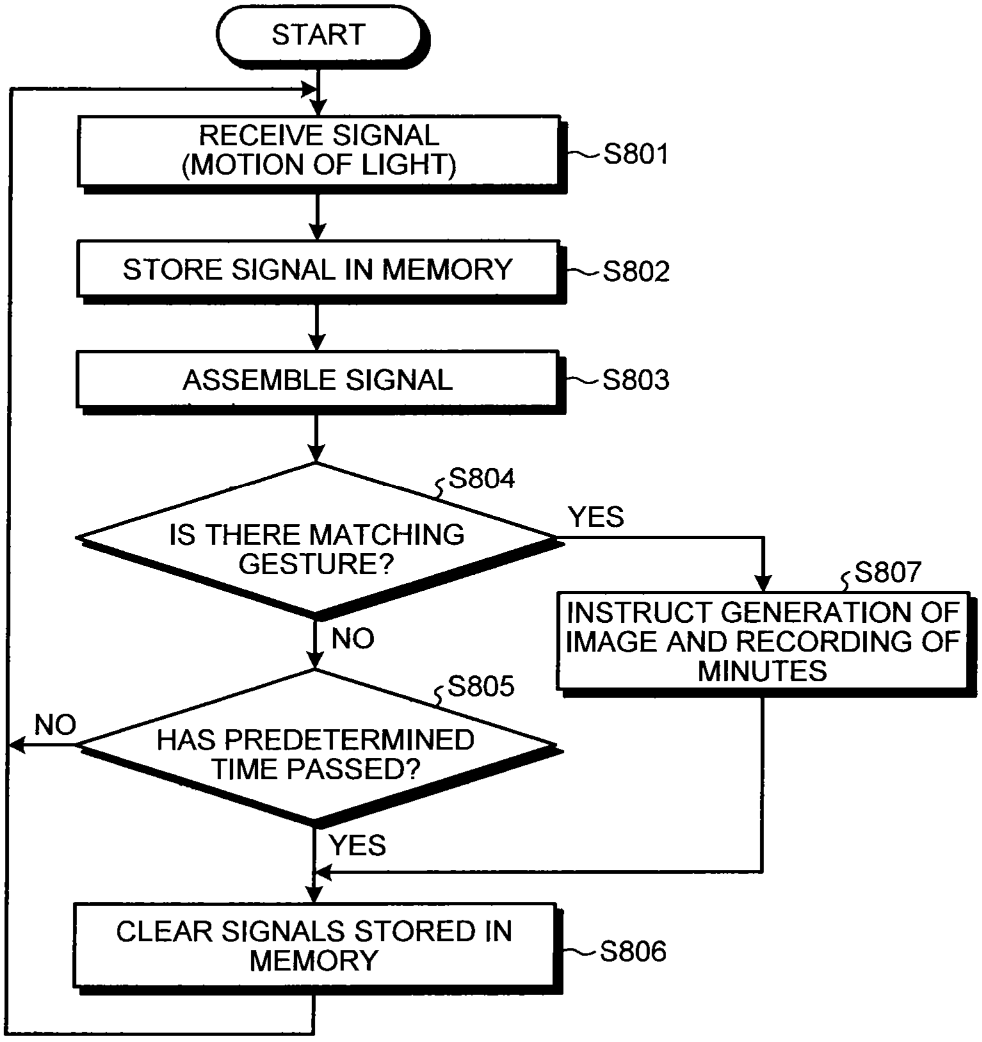
FIG. 17 is a flowchart illustrating an example of a flow of signal assembly processing.

Next, a flow of signal assembly processing will be described using FIG. 17. FIG. 17 is a flowchart illustrating an example of a flow of signal assembly processing.

As illustrated in FIG. 17, the identification unit 123 receives an operation signal transmitted from the operating device, and the motion of light the image of which is captured by the image capturing unit 121 and which is emitted to, for example, the screen using the operating device (step S801). Further, the identification unit 123 stores the received signal (the motion of light) in the memory (step S802). Furthermore, the identification unit 123 assembles the motion of light at this point of time (step S803).

Subsequently, the identification unit 123 decides whether or not there is a gesture matching the motion of the assembled light (step S804). Whether or not there is a gesture matching the motion of the assembled light is decided by acquiring a role associated with an operating device ID included in the operation signal from the role storage unit 112 and deciding whether or not a gesture of the acquired role is stored in the gesture information storage unit 113. In this case, when deciding that there is the gesture matching the motion of the assembled light (step S804: Yes), the identification unit 123 instructs the synthetic image generation unit 125 and the history record unit 126 to generate an image and generate minute data (step S807).

Meanwhile, when deciding that there is not a gesture matching the motion of the assembled light (step S804: No), the identification unit 123 decides whether or not a predetermined time passed (step S805). In this case, when deciding that the predetermined time passed (step S805: Yes), the identification unit 123 clears (initializes) the motion of light stored in the memory (step S806). Meanwhile, when deciding that the predetermined time did not pass (step S805: No), the identification unit 123 executes processing in step S801 again. That is, the user does not finish operating the operating device within the predetermined time (the user is making a gesture) in some cases, and, therefore, when there is not a matching gesture when the predetermined time passes, the motion of light stored in the memory at this point of time is cleared.

As described above, the information processing device 100 generates a synthetic image which reflects an attribute associated with a gesture in response to an operation of the operating device by the user who is a participant of a conference, in an image projected by the projecting device 20, and generates minute data including, for example, the synthetic image, a role of the user at the conference and an attribute. As a result, the information processing device 100 can easily create conference minutes without decreasing a proceeding speed of the conference.

Further, pointing out intended by the pointer by way of a gesture is represented by way of marking in the minute data, so that it is possible to easily recognize the intension of the pointing out by the pointer even when the minute data is checked later. Furthermore, when it is difficult to identify a similar gesture, a gesture of a higher use frequency is adopted using a use frequency of a gesture, so that it is possible to efficiently lead the conference without stopping the progress of the conference. Still further, roles of the operating devices are not fixed to specific roles and can be dynamically determined, so that it is possible to support various conferences at which various participants attend.

Second Embodiment

Although a case has been described with the above first embodiment where a pointer performs pointing out to a presentation of a presentation material by a presenter during a conference, the presenter can respond to the pointing out and also adequately add a comment. Hence, a case will be described with a second embodiment where the presenter responds to pointing out and adequately add a comment.

System Configuration According to Second Embodiment

Figure 18:
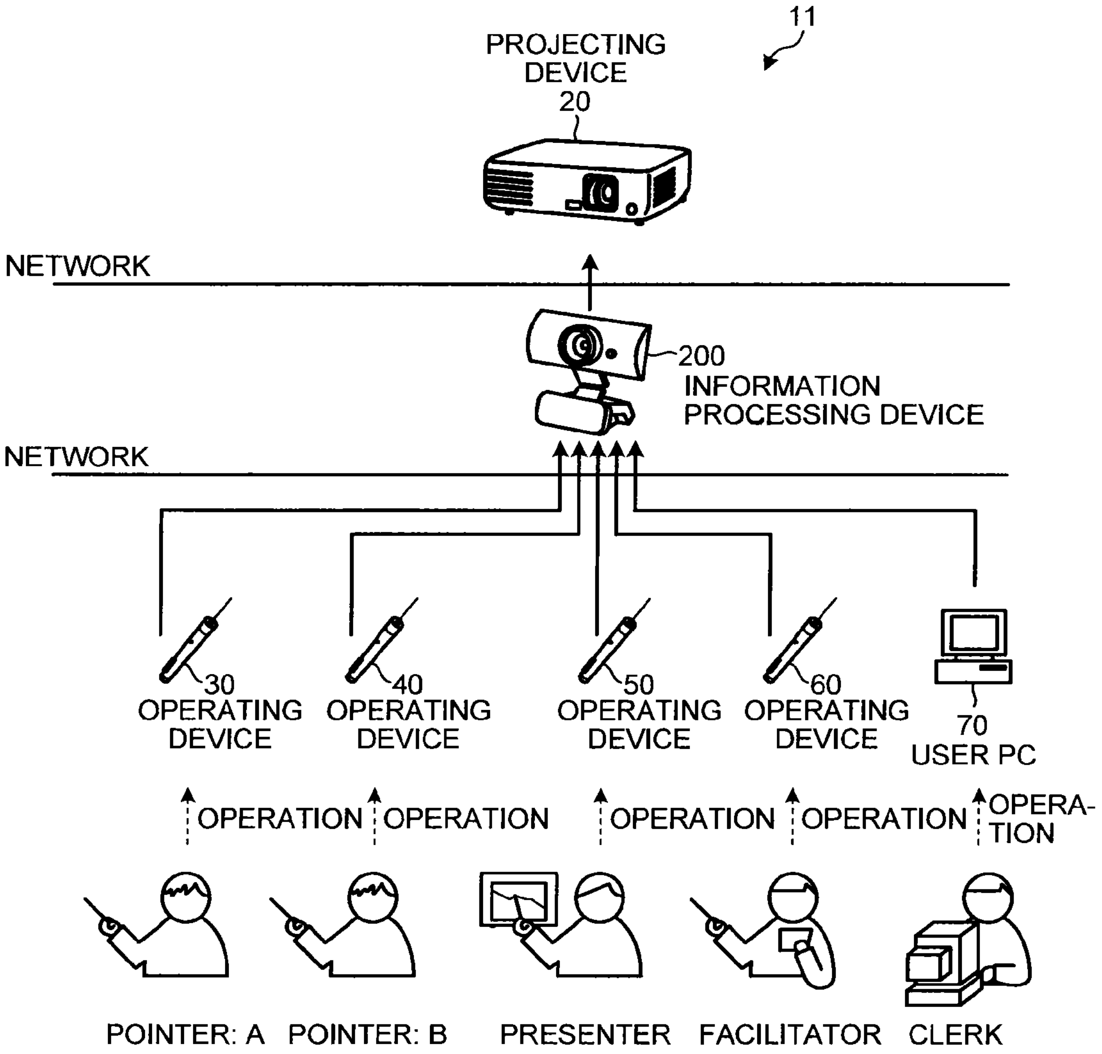
FIG. 18 is a view illustrating a configuration example of a projecting system according to a second embodiment.

A configuration of a projecting system according to the second embodiment will be described using FIG. 18. FIG. 18 is a view illustrating a configuration example of the projecting system according to the second embodiment.

As illustrated in FIG. 18, in a projecting system 11, a projecting device 20, an operating device 30, an operating device 40, an operating device 50, an operating device 60, a user PC 70 and an information processing device 200 are connected to networks. The same configurations as those of the first embodiment will be assigned the same reference numerals in FIG. 18, and will not be described. In the second embodiment, the new user PC 70 is added to the projecting system 11.

The user PC 70 is an input device which is used by a user who plays a role of a clerk, and which can receive an input of a comment. To input a comment from the user PC 70 to the information processing device 200, implementing means such as an API (Application Programming Interface) or a Web Service which is generally spreading is used instead of a gesture. Further, a comment can be input in every scene such as during a presentation of the presenter, during pointing out of a pointer or during the following response to the pointing out from the presenter, and can also be included in minute data.

Figure 19:
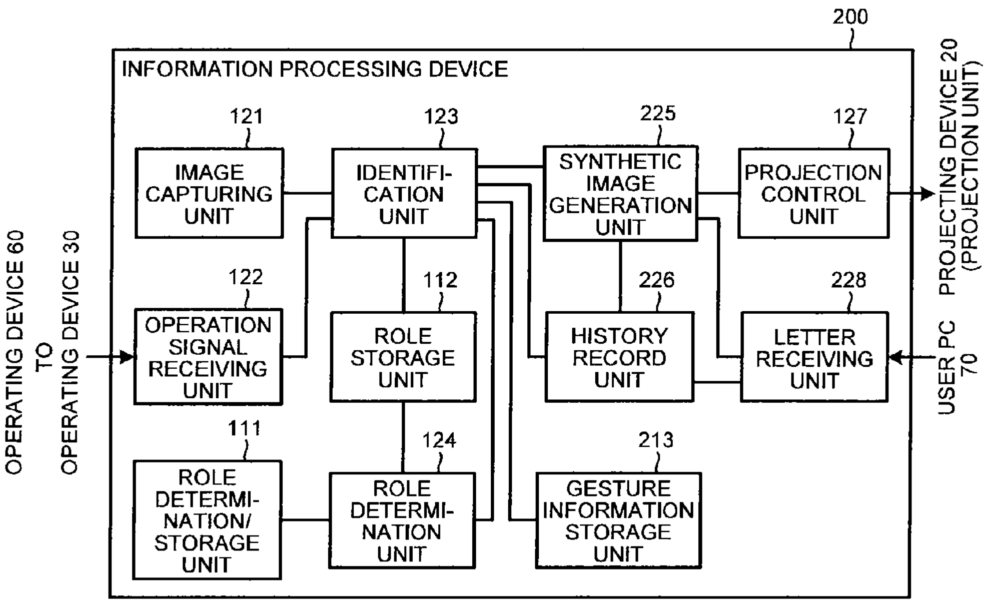
FIG. 19 is a functional block diagram illustrating a configuration example of an information processing device according to the second embodiment.

Configuration of Information Processing Device According to Second Embodiment Next, the configuration of the information processing device 200 according to the second embodiment will be described using FIG. 19. FIG. 19 is a functional block diagram illustrating a configuration example of the information processing device 200 according to the second embodiment. The same configurations as those of the first embodiment will be assigned the same reference numerals in FIG. 19, and will not be described. In the second embodiment, a function, a configuration and processing of each unit other than a gesture information storage unit 213, a synthetic image generation unit 225, a history record unit 226 and a letter receiving unit 228 described below are the same as those of the first embodiment.

As illustrated in FIG. 19, the information processing device 200 has a role determination storage unit 111, a role storage unit 112, the gesture information storage unit 213, an image capturing unit 121, an operation signal receiving unit 122, an identification unit 123, a role determination unit 124, the synthetic image generation unit 225, the history record unit 226, a projection control unit 127 and the letter receiving unit 228.

The letter receiving unit 228 receives an input of a comment (letter data) from the user PC 70 used by the user who plays the role "clerk". The comment input from the user PC 70 is adequately input in a scene such as during a presentation, during pointing out or during a response. Further, the letter receiving unit 228 outputs the received comment to the synthetic image generation unit 225 and to the history record unit 226.

The synthetic image generation unit 225 generates a synthetic image by synthesizing the comment adequately output from the letter receiving unit 228 and an image which is being projected, and outputs the generated synthetic image to the projection control unit 127. The history record unit 226 receives the comment adequately output from the letter receiving unit 228, and generates minute data which records the received comment.

Further, a case will be described with the second embodiment where the presenter responds to pointing out of the pointer. In this case, the gesture information storage unit 213 further stores information different from that of the gesture information storage unit 113 according to the first embodiment. More specifically, the gesture information storage unit 213 associates and stores an attribute, a use frequency, a role of a user and a gesture of the presenter during pointing out and during a response.

FIG. 20 is a view illustrating an example of information stored in the gesture information storage unit 213 according to the second embodiment. In addition, FIG. 20 illustrates gesture information about the presenter only for ease of description. As illustrated in FIG. 20, the gesture information storage unit 213 associates and stores "attribute", "use frequency", "role of user" and "gesture" during a presentation, during pointing out and during a response by the role "presenter" of the user during the conference.

With an example, the gesture information storage unit 213 associates and stores an attribute "page turn", a use frequency "high", a role of a user "presenter" and a right-arrow gesture as gesture information during the presentation of the presenter. Further, the gesture information storage unit 213 associates and stores an attribute "start of response", the use frequency "high", the role of the user "presenter" and a circle gesture as gesture information during pointing out of the presenter. Furthermore, the gesture information storage unit 213 associates and stores the attribute "page turn", the use frequency "high", the role of a user "presenter" and the right-arrow gesture as gesture information during a response of the presenter.

Still further, a flow of processing of the identification unit 123 according to the second embodiment is the same as a flow of processing of an identification unit 123 according to the first embodiment. Hereinafter, only processing of the identification unit 123 which uses information of the gesture information storage unit 213 different from the gesture information storage unit 113 will be described.

The identification unit 123 receives the operation signal from the operating device 50 operated by the presenter during pointing out of the pointer through the operation signal receiving unit 122, and receives the circle gesture using the operating device 50 from the image capturing unit 121. In this case, the identification unit 123 acquires the role "presenter" from the role storage unit 112 based on an operating device ID included in the operation signal, and acquires the attribute "start of response" of the circle gesture associated with the role "presenter" from the gesture information storage unit 213. By this means, the identification unit 123 identifies that the presenter using the operating device 50 made a gesture of starting responding to the pointing out.

Further, the identification unit 123 notifies that a response to the pointing out is started, to the synthetic image generation unit 225, and notifies the history record unit 226 of the generation of minute data which records that the presenter starts responding to the pointing out.

The synthetic image generation unit 225 which received a notice that a response to the pointing out is started from the identification unit 123 generates a synthetic image obtained by synthesizing an image of the presentation material which is being projected and an image representing a gesture of the presenter who can perform an operation during a response and an attribute of the gesture, and instructs the projection control unit 127 to project the synthetic image. By this means, the projection control unit 127 performs control of projecting the synthetic image on the projecting device 20. Meanwhile, the history record unit 226 which received a notice of generation of minute data from the identification unit 123 acquires a time stamp in this case, and generates the minute data which records that the presenter starts responding to the pointing out. In addition, the flow of processing of the identification unit 123 during the response is the same as the above flow and therefore will not be described.

Image During Response and During Pointing Out

Next, an image projected on a screen during pointing out and during a response according to the second embodiment will be described using FIG. 21. FIG. 21 is a view illustrating an example of an image projected on the screen during pointing out and during a response according to the second embodiment.

As illustrated in FIG. 21, an image projected on the screen during the pointing out includes a presentation material explained by the presenter during the presentation, a gesture, an attribute and a marking color for the pointer, a gesture and an attribute for the facilitator, a gesture and an attribute for the presenter and comments (comment columns) of the pointer and the respondent. Further, the pointing out is on-going, so that a pointed-out matter pointed out by the pointer and a portion of the pointed-out matter are marked in the presentation material. In response to the pointing out of the pointer, the presenter makes a gesture of starting responding to the pointing out, and switches to an image during the response.

Further, an image projected on the screen during the response includes a presentation material explained by the presenter during the presentation, a gesture, an attribute and a marking color for the pointer, a gesture and an attribute for the facilitator, a gesture and an attribute for the presenter and comments (comment columns) of the pointer and the respondent. Furthermore, a pointed-out matter pointed out by the pointer during pointing out and a portion of the pointed-out matter are marked in the presentation material. The presenter makes a gesture such as "page turn" or "enlargement of screen", and responds to the pointing out.

Minute Data According to Second Embodiment

Next, minute data according to the second embodiment will be described using FIG. 22. FIG. 22 is a view illustrating an example of minute data according to the second embodiment.

As illustrated in FIG. 22, the minute data includes roles of participants who participated in a conference, a start time and an end time of the conference, images in which a pointed-out matter is marked in each presentation material, description of the pointed-out matter, a response to the pointing out and comments of the participants. Further, similar to the pointed-out matters, responses are numbered response numbers such as "response 2-1" in order of responses.

Responding Sequence

Figure 23:
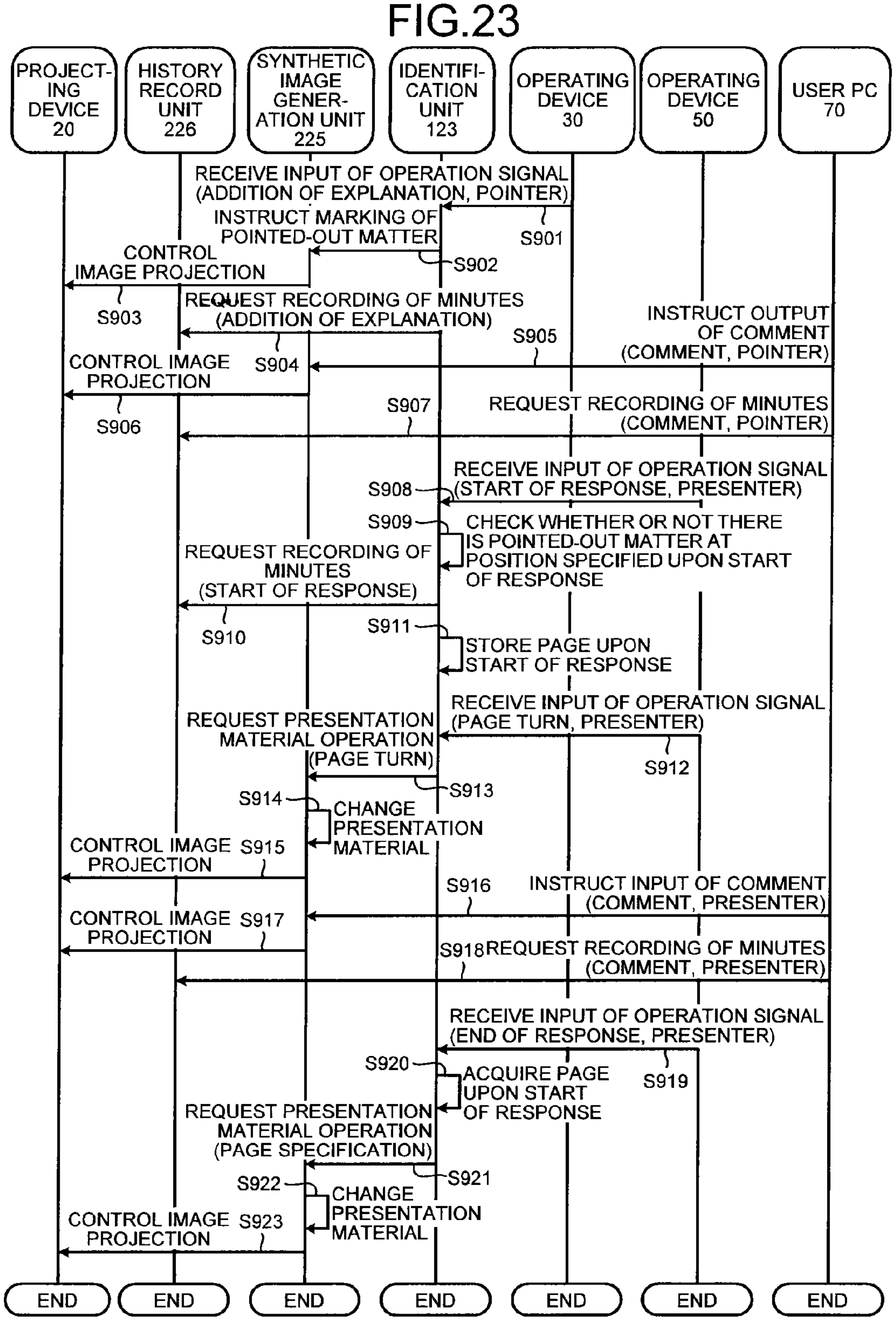
FIG. 23 is a processing sequence diagram illustrating an example during a response.

Next, a processing sequence during a response will be described using FIG. 23. FIG. 23 is a processing sequence diagram illustrating an example during a response.

As illustrated in FIG. 23, according to an operation of the user using the operating device 30, the operation signal is input to the identification unit 123 through the operation signal receiving unit 122 (step S901). In this case, the identification unit 123 also receives an input of the less-than sign gesture (addition of explanation) in response to the motion of light the image of which is captured by the image capturing unit 121. Further, the identification unit 123 assembles the input signal, then acquires a role "pointer" referring to the role storage unit 112 based on an operating device ID "1002" included in the operation signal and acquires an attribute "addition of explanation" of the less-than sign gesture associated with the role "pointer" and a marking color "yellow" referring to the gesture information storage unit 213. By this means, the identification unit 123 identifies that a gesture of adding explanation to a predetermined portion was received from the user of the operating device 30 who is the pointer. Subsequently, the identification unit 123 instructs the synthetic image generation unit 225 to change the pointed-out matter "addition of explanation" of the predetermined portion to an image marked by yellow (step S902).

Further, when receiving an instruction of changing the image from the identification unit 123, the synthetic image generation unit 225 generates a synthetic image obtained by synthesizing an image of the presentation material which is being projected and an image representing the predetermined portion marked by yellow and the pointed-out matter "addition of explanation". Furthermore, the synthetic image generation unit 225 performs control of projecting the generated synthetic image on the projecting device 20 through the projection control unit 127 (step S903). Still further, the identification unit 123 requests the history record unit 226 to generate minute data which records pointed-out matters of the pointer on the presentation material (step S904). By this means, the history record unit 226 acquires a time stamp in this case, numbers pointing-out numbers and generates the minute data.

Further, according to an operation of a user using the user PC 70, the comment of the pointer is input to the synthetic image generation unit 225 through the letter receiving unit 228 while the pointer performs pointing out (step S905). In response to this, the synthetic image generation unit 225 generates a synthetic image by synthesizing the received comment and the image which is being projected, and performs control of projecting the generated synthetic image on the projecting device 20 through the projection control unit 127 (step S906). Further, according to an operation of a user using the user PC 70, the comment of the pointer is input to the history record unit 226 through the letter receiving unit 228 while the pointer performs pointing out (step S907). In response to this, the history record unit 226 generates minute data which records the received comment.

Further, according to an operation of the user using the operating device 50, the operation signal is input to the identification unit 123 through the operation signal receiving unit 122 (step S908). In this case, the identification unit 123 also receives an input of the circle gesture (start of response) in response to the motion of light the image of which is captured by the image capturing unit 121. Further, the identification unit 123 assembles the input signal, then acquires the role "presenter" referring to the role storage unit 112 based on an operating device ID "1001" included in the operation signal and acquires an attribute "start of response" of the circle gesture associated with the role "presenter" referring to the gesture information storage unit 213. By this means, the identification unit 123 identifies that a gesture of starting a presenter's response to the pointing out is received.

Further, when identifying the start of the response, the identification unit 123 checks that there is a pointed-out matter pointed out during pointing out (step S909). Furthermore, the identification unit 123 notifies the synthetic image generation unit 225 of the start of the response to the pointing out, and the synthetic image generation unit 225 generates a synthetic image obtained by synthesizing an image of the presentation material which is being projected and an image representing a gesture of the presenter who can perform an operation during a response and an attribute of the gesture and controls projection of the synthetic image through the projection control unit 127. Subsequently, the identification unit 123 notifies generation of minute data which records that the presenter starts responding to the pointing out, to the history record unit 226 (step S910). In response to this, the history record unit 226 generates minute data which records that the response to the pointing is started. Further, the identification unit 123 stores in the memory a page of the presentation material projected when the response is started (step S911).

Furthermore, according to an operation of the user using the operating device 50, the operation signal is input to the identification unit 123 through the operation signal receiving unit 122 while the presenter make a response (step S912). In this case, the identification unit 123 also receives an input of the right-arrow gesture (page turn) in response to the motion of light the image of which is captured by the image capturing unit 121. Further, the identification unit 123 assembles the input signal, then acquires the role "presenter" referring to the role storage unit 112 based on an operating device ID "1001" included in the operation signal and acquires the attribute "page turn" of the right-arrow gesture associated with the role "presenter" referring to the gesture information storage unit 213. By this means, the identification unit 123 identifies that the user of the operating device 50 who is the presenter makes a gesture of turning a page of the presentation material. Subsequently, the identification unit 123 notifies the synthetic image generation unit 225 that the page of the presentation material is turned (step S913).

Further, when receiving the notice that the page of the presentation material is turned, from the identification unit 123, the synthetic image generation unit 225 turns the page of the presentation material which is being projected and changes the presentation material (step S914). More specifically, the synthetic image generation unit 225 generates a synthetic image obtained by synthesizing an image in which the page of the presentation material which is being projected is turned and an image representing a gesture which can perform an operation during the response and an attribute of the gesture per role. Further, the synthetic image generation unit 225 performs control of projecting the generated synthetic image on the projecting device 20 through the projection control unit 127 (step S915). Furthermore, the identification unit 123 requests the history record unit 226 to generate minute data which records that the presenter turned the page, and, in response to this, the history record unit 226 acquires a time stamp in this case and generates minute data.

Still further, according to an operation of the user using the user PC 70, the comment of the presenter is input to the synthetic image generation unit 225 through the letter receiving unit 228 while the presenter makes a response (step S916). In response to this, the synthetic image generation unit 225 generates a synthetic image by synthesizing the received comment and the image which is being projected, and performs control of projecting the generated synthetic image on the projecting device 20 through the projection control unit 127 (step S917). Further, according to an operation of the user using the user PC 70, the comment of the presenter is input to the history record unit 226 through the letter receiving unit 228 while the presenter makes a response (step S918). In response to this, the history record unit 226 generates minute data which records the received comment.

Further, according to an operation of the user using the operating device 50, the operation signal is input to the identification unit 123 through the operation signal receiving unit 122 while the presenter make a response (step S919). In this case, the identification unit 123 also receives an input of a double-slash gesture (end of response) in response to the motion of light the image of which is captured by the image capturing unit 121. Further, the identification unit 123 assembles the input signal, then acquires the role "presenter" referring to the role storage unit 112 based on the operating device ID "1001" included in the operation signal and acquires an attribute "end of response" of the double slash gesture associated with the role "presenter" referring to the gesture information storage unit 213. By this means, the identification unit 123 identifies that a gesture of ending a presenter's response was received.

Further, when identifying the end of the response, the identification unit 123 acquires the page of the presentation material stored in the memory in step S911 (step S920). Furthermore, the identification unit 123 requests the synthetic image generation unit 225 to change a page to the acquired page of the presentation material (step S921). Still further, the synthetic image generation unit 225 changes the presentation material to the specified page according to the received request (step S922). Moreover, the synthetic image generation unit 225 generates a synthetic image obtained by synthesizing an image of the presentation material of the specified page and an image representing the gesture which can perform an operation during the presentation and an attribute of the gesture per role, and performs control of projecting the generated synthetic image on the projecting device 20 through the projection control unit 127 (step S923).

As described above, the information processing device 200 generates minute data which adequately records a status of a response to a pointed-out matter and visualizes content of a conference during a conference as a comment, so that it is possible to realize a more efficient conference and generate a more precise minute data.

Third Embodiment

Although embodiments of an information processing device 100 and an information processing device 200 according to the present invention have been described above, the present invention may be implemented in various different embodiments other than the above embodiments. Hereinafter, (1) a configuration and (2) a program of a different embodiment will be described.

(1) Configuration

Information including, for example, processing procedure, control procedure, specific names, various items of data and various parameters described in the above description and illustrated in the drawings can be arbitrarily changed unless particularly described. For example, information stored in a gesture information storage unit 113 and a gesture information storage unit 213 is by no means limited to the illustrated ones and can be adequately changed.

Further, each component of the illustrated information processing device 100 and information processing device 200 is functionally conceptual, and may not necessarily be physically configured as illustrated. That is, a specific embodiment of dispersion and integration of each device is by no means limited to the illustrated ones, and the entirety or part of each device may be functionally or physically dispersed or integrated in arbitrary units according to various loads or use situations.

Figure 24:
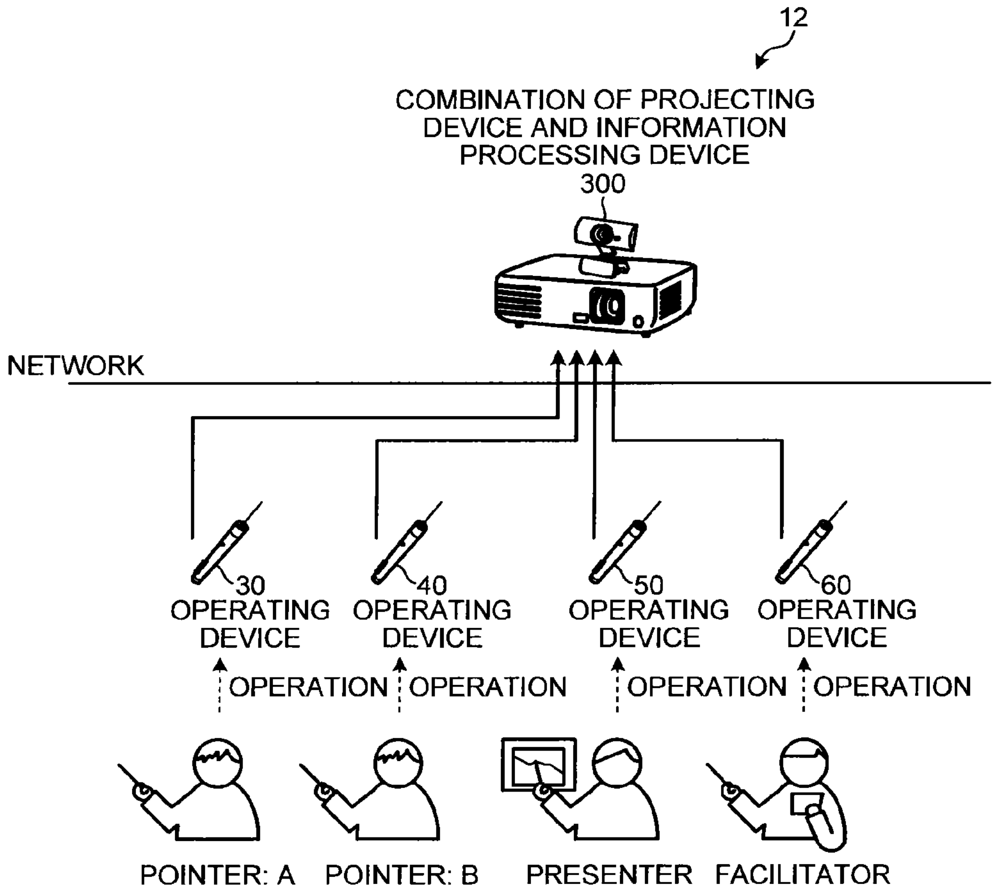
FIG. 24 is a view illustrating a configuration example of a projecting system according to a third embodiment.
Figure 25:
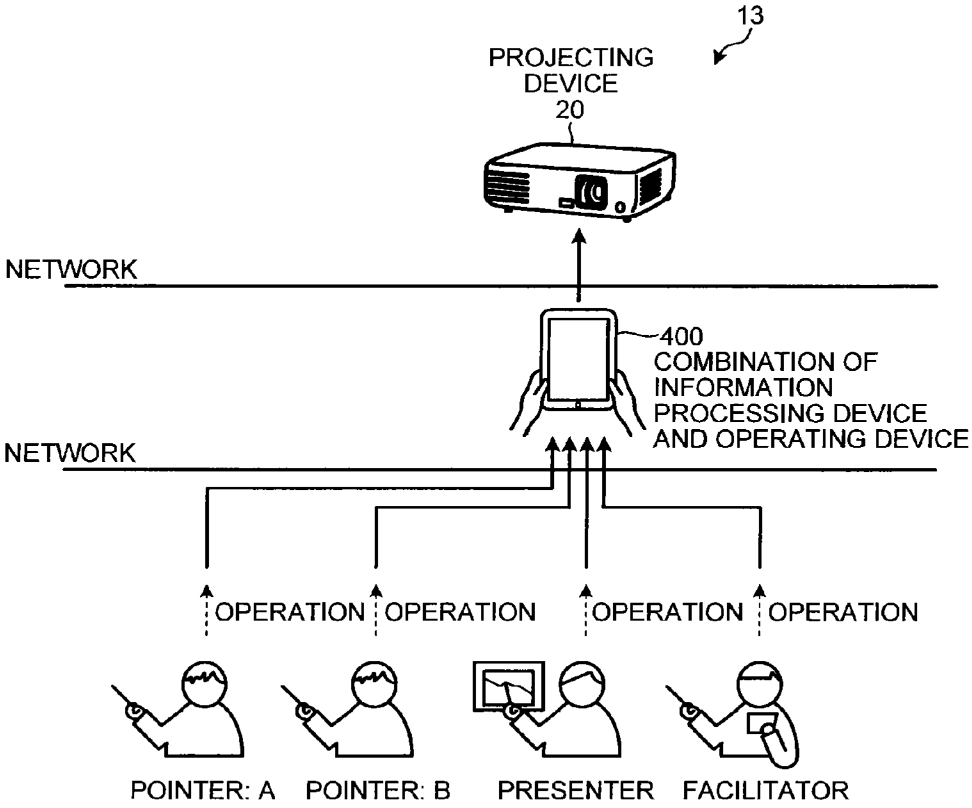
FIG. 25 is a view illustrating a configuration example of the projecting system according to the third embodiment.

Although the above embodiments have been described using a projecting system 10 and a projecting system 11 as examples, the present invention can be realized by a system configuration different from those of the projecting system 10 and the projecting system 11. FIGS. 24 and 25 are views illustrating configuration examples of a projecting system according to a third embodiment.

As illustrated in FIG. 24, in a projecting system 12, an information processing device 300 in which a projecting device 20 and an information processing device 100 are integrated, an operating device 30, an operating device 40, an operating device 50, and an operating device 60 are connected to networks. In addition, the function of each device is the same as described in the above embodiments.

As illustrated in FIG. 25, in a projecting system 13, the projecting device 20 and an information processing device 400 in which the operating device 30 to the operating device 60 and an information processing device 100 are integrated are connected to networks. In the projecting system 13, the information processing device 400 employs a configuration of identifying a gesture when a user makes a gesture with respect to a display (touch panel display) or operates a touch panel. In addition, the other functions are the same as described in the above embodiments.

(2) Program

Figure 26:
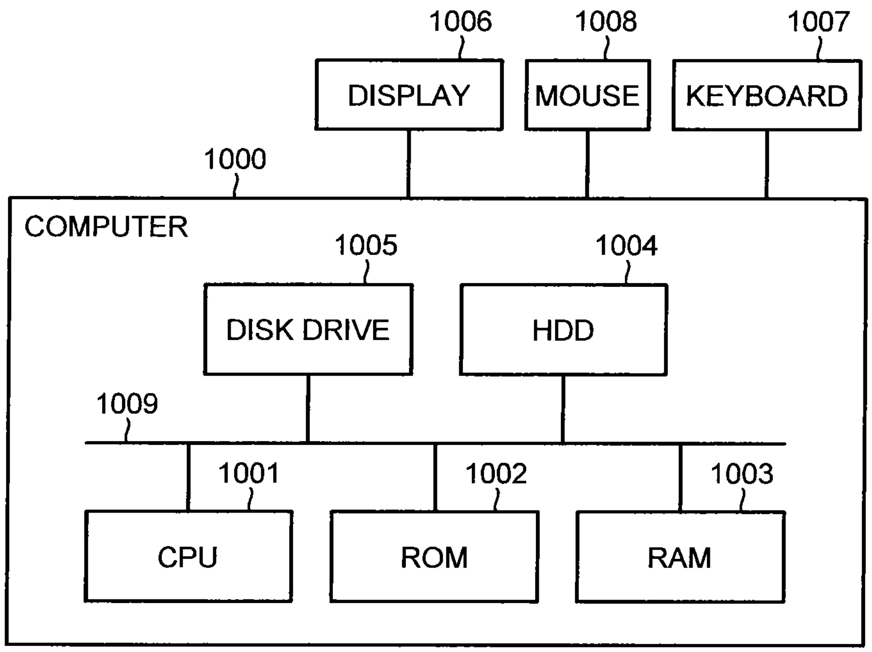
FIG. 26 is a view illustrating that a history data generating program is realized using a computer.

FIG. 26 is a view illustrating that a history data generating program is realized using a computer. For example, as illustrated in FIG. 26, a computer 1000 which is the information processing device 100 has a control device such a central processing unit (CPU) 1001 connected through a bus 1009, storage devices such as a read only memory (ROM) 1002 and a random access memory (RAM) 1003, external storage devices such as a hard disk drive (HDD) 1004 and a disk drive 1005, a display device such as a display 1006 and input devices such as a keyboard 1007 and a mouse 1008, and employs a hardware configuration using a common computer.

According to the embodiments, a history data generating program executed by the information processing device 100 is provided by being recorded in a storage medium such as a CD-ROM, a flexible disk (FD), a CD-R, or a digital versatile disk (DVD) which can be read by a computer as a file in an installable format or an executable format. Further, the history data generating program executed by the information processing device 100 may be provided by being stored in a computer connected to a network such as Internet and being downloaded through the network. Furthermore, the history data generating program executed by the information processing device 100 may be provided or distributed through the network such as Internet. Still further, the history data generating program may be provided by being embedded in, for example, a ROM.

The history data generating program executed by the information processing device 100 employs a module configuration including each of the above function units (the identification unit 123, the synthetic image generation unit 125 and the history record unit 126), and, when a CPU (processor) which serves as actual hardware reads the history data generating program from the storage medium and executes the history data generating program, so that each of the above function units is loaded on a main storage device, and the identification unit 123, the synthetic image generation unit 125 and the history record unit 126 are generated on the main storage device.

According to the embodiments, there is provided an effect of easily creating conference minutes without decreasing a proceeding speed of a conference.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device for detecting operation of a plurality of operating devices, each operating device including a light emitting unit, the information processing device comprising:

a role information storage unit configured to store therein role information in which each of the operating devices is associated with any one of roles assigned to a user who operates the each of the operating devices;

an operation information storage unit configured to store therein operation information in which motions of light to be emitted from the light emitting unit of the operating device are associated with instructions to the operating device indicated by the motions, respectively;

an image capturing unit configured to capture the motion of the light emitted by the operating device to a projection area on which a projecting device projects an image;

a role determining unit configured to determine, based on the role information, a role of a user assigned to the operating device having emitted the light captured by the image capturing unit;

an instruction determining unit configured to determine, based on the operation information, an instruction indicated by the motion of the light captured by the image capturing unit; and a history data generating unit configured to generate history data by recording information on the instruction determined by the instruction determining unit, wherein, when the instruction determining unit determines the instruction as an instruction to change display on a screen, the history data generating unit generates history data in minutes format in which the instruction is recorded and an image being displayed on the screen is marked based on the instruction, and a description of the instruction is associated with an image to be displayed on the screen after changing display in the history data.

2. The information processing device according to claim 1, wherein the history data includes role information of each user who operates each of the operating devices, and a start time and an end time.

3. The information processing device according to claim 1, further comprising a synthetic image generation unit configured to generate a synthetic image obtained by synthesizing an indication of the instruction determined by the instruction determining unit and the projected image when the role determining unit determines the role as a predetermined role, and record the synthetic image into the history data.

4. The information processing device according to claim 1, wherein the marked image and the description of the instruction are numbered in order.

* * * * *